US011016294B2

(12) United States Patent
Ichii

(10) Patent No.: US 11,016,294 B2
(45) Date of Patent: May 25, 2021

(54) OPTICAL SCANNER, DISPLAY SYSTEM, AND MOBILE OBJECT

(71) Applicant: Daisuke Ichii, Kanagawa (JP)

(72) Inventor: Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/715,932

(22) Filed: Dec. 16, 2019

(65) Prior Publication Data

US 2020/0241294 A1 Jul. 30, 2020

(30) Foreign Application Priority Data

Jan. 30, 2019 (JP) .............................. JP2019-014078

(51) Int. Cl.
| | |
|---|---|
| *G02B 27/01* | (2006.01) |
| *B60R 1/00* | (2006.01) |
| *G02B 26/10* | (2006.01) |
| *G02B 27/00* | (2006.01) |
| *B60R 11/00* | (2006.01) |

(Continued)

(52) U.S. Cl.
CPC ............ *G02B 27/0101* (2013.01); *B60R 1/00* (2013.01); *G02B 26/101* (2013.01); *G02B 27/0093* (2013.01); *B60R 2011/0026* (2013.01); *G02B 2027/014* (2013.01)

(58) Field of Classification Search
USPC .......................................................... 345/7
See application file for complete search history.

(56) References Cited

U.S. PATENT DOCUMENTS

| | | | |
|---|---|---|---|
| 2003/0015652 A1* | 1/2003 | Kandori | G02B 26/101 250/234 |
| 2006/0007113 A1* | 1/2006 | Hwang | H04N 9/3129 345/102 |

(Continued)

FOREIGN PATENT DOCUMENTS

| | | |
|---|---|---|
| EP | 3267236 A1 | 1/2018 |
| JP | 2015-194695 | 11/2015 |

(Continued)

OTHER PUBLICATIONS

Extended European Search Report dated Jul. 2, 2020 issued in corresponding European Application No. 19218228.5.

*Primary Examiner* — Chineyere D Wills-Burns
(74) *Attorney, Agent, or Firm* — Harness, Dickey & Pierce, P.L.C.

(57) ABSTRACT

An optical scanner, a display system, and a mobile object. The optical scanner includes a light source to emit irradiation light, a light deflector to scan the irradiation light emitted from the light source in a first scanning direction and in a second scanning direction intersecting with the first scanning direction, circuitry to turn on the light source for a predetermined length of time, and a photodetector to detect the irradiation light for the predetermined length of time. The predetermined length of time includes a timing at which the light deflector turns a scanning direction in the first scanning direction or the second scanning direction. The display system includes the optical scanner, a divergent part through which the irradiation light scanned by the light deflector is projected and diverges, and an imaging optical system to reflect projection light projected through the divergent part.

20 Claims, 19 Drawing Sheets

(51) Int. Cl.
*G03B 21/625* (2014.01)
*G03B 33/06* (2006.01)
*G03B 21/10* (2006.01)

(56) References Cited

U.S. PATENT DOCUMENTS

| | | | |
|---|---|---|---|
| 2010/0026960 A1* | 2/2010 | Sprague | H04N 13/275 |
| | | | 353/28 |
| 2014/0293391 A1* | 10/2014 | Hashimoto | G02B 26/101 |
| | | | 359/202.1 |
| 2015/0198802 A1* | 7/2015 | Ando | G02B 27/0905 |
| | | | 359/200.8 |
| 2017/0154558 A1* | 6/2017 | Atsuumi | G02B 27/0031 |
| 2017/0269352 A1* | 9/2017 | Hashiguchi | H01L 41/042 |
| 2017/0270637 A1* | 9/2017 | Perreault | G02B 27/0172 |
| 2018/0013992 A1* | 1/2018 | Hayashi | G02B 27/0149 |
| 2018/0067308 A1* | 3/2018 | Sakai | H05B 47/105 |
| 2018/0149858 A1* | 5/2018 | Ito | G02B 26/0841 |
| 2018/0240387 A1 | 8/2018 | Atsuumi et al. | |
| 2019/0097396 A1 | 3/2019 | Sakai et al. | |
| 2019/0285886 A1* | 9/2019 | Yamashiro | H04N 1/047 |

FOREIGN PATENT DOCUMENTS

| | | |
|---|---|---|
| JP | 2017-120371 | 7/2017 |
| JP | 2017-199710 | 11/2017 |
| JP | 2018-005162 | 1/2018 |
| JP | 2018-041849 | 3/2018 |
| JP | 2018-155989 | 10/2018 |

\* cited by examiner

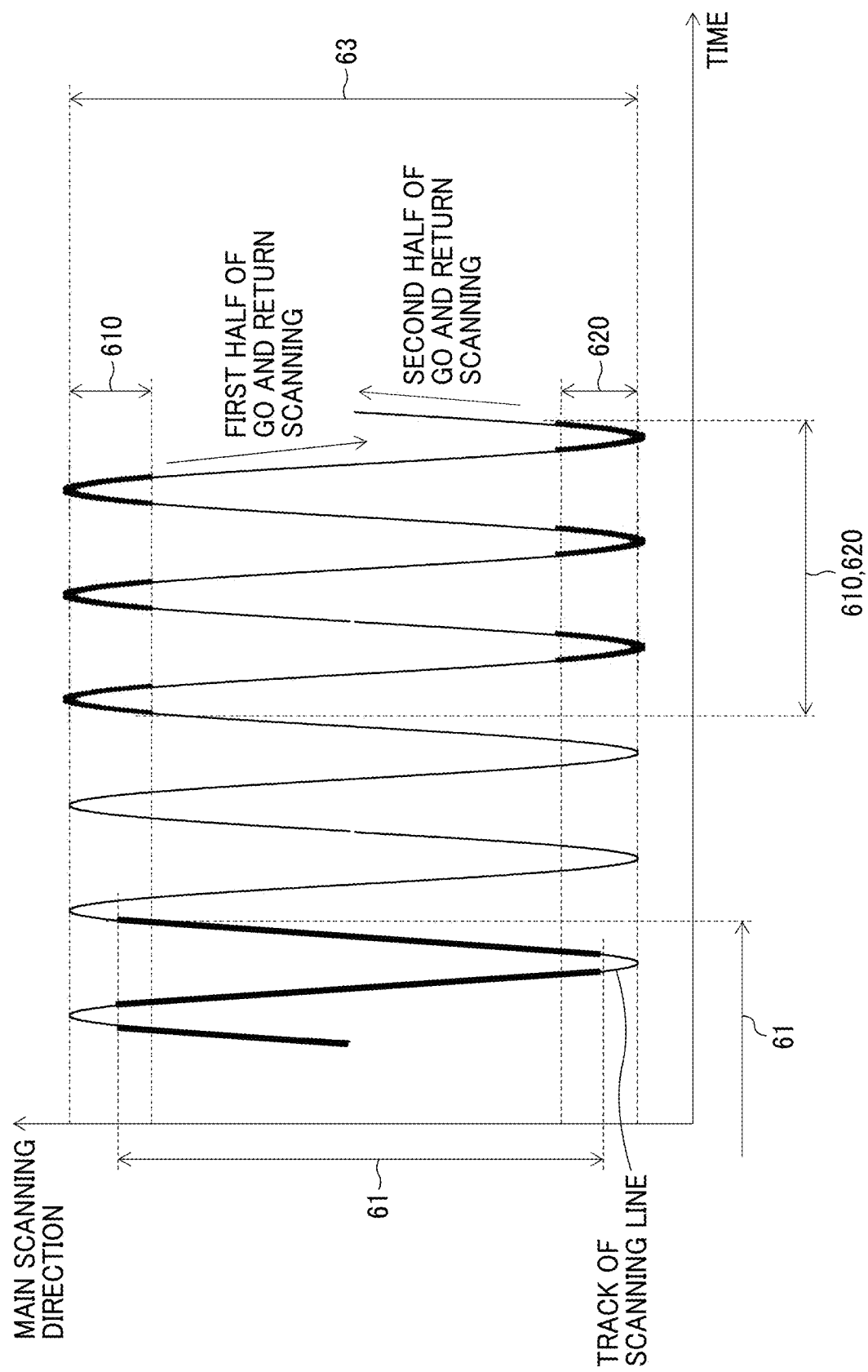

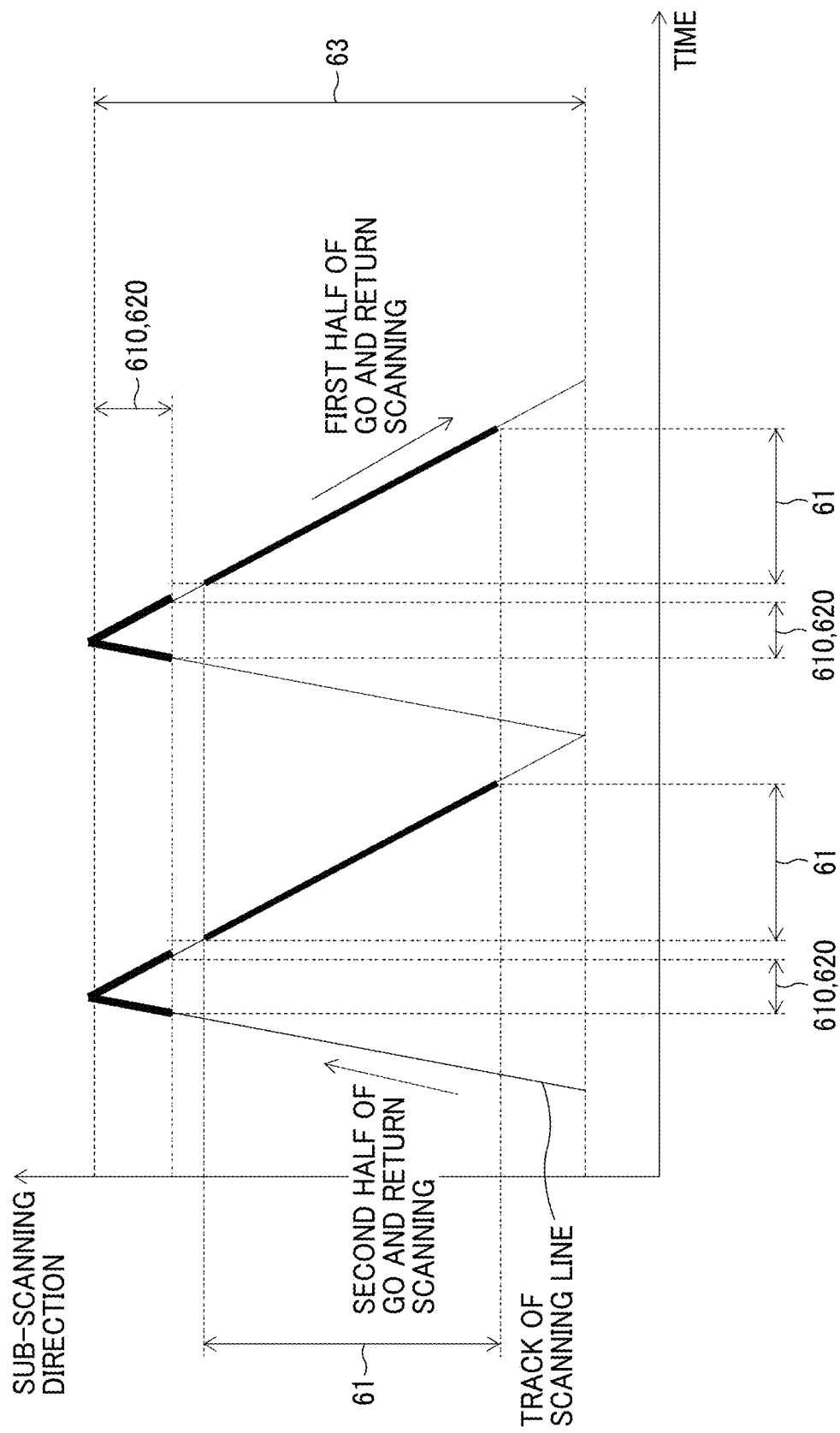

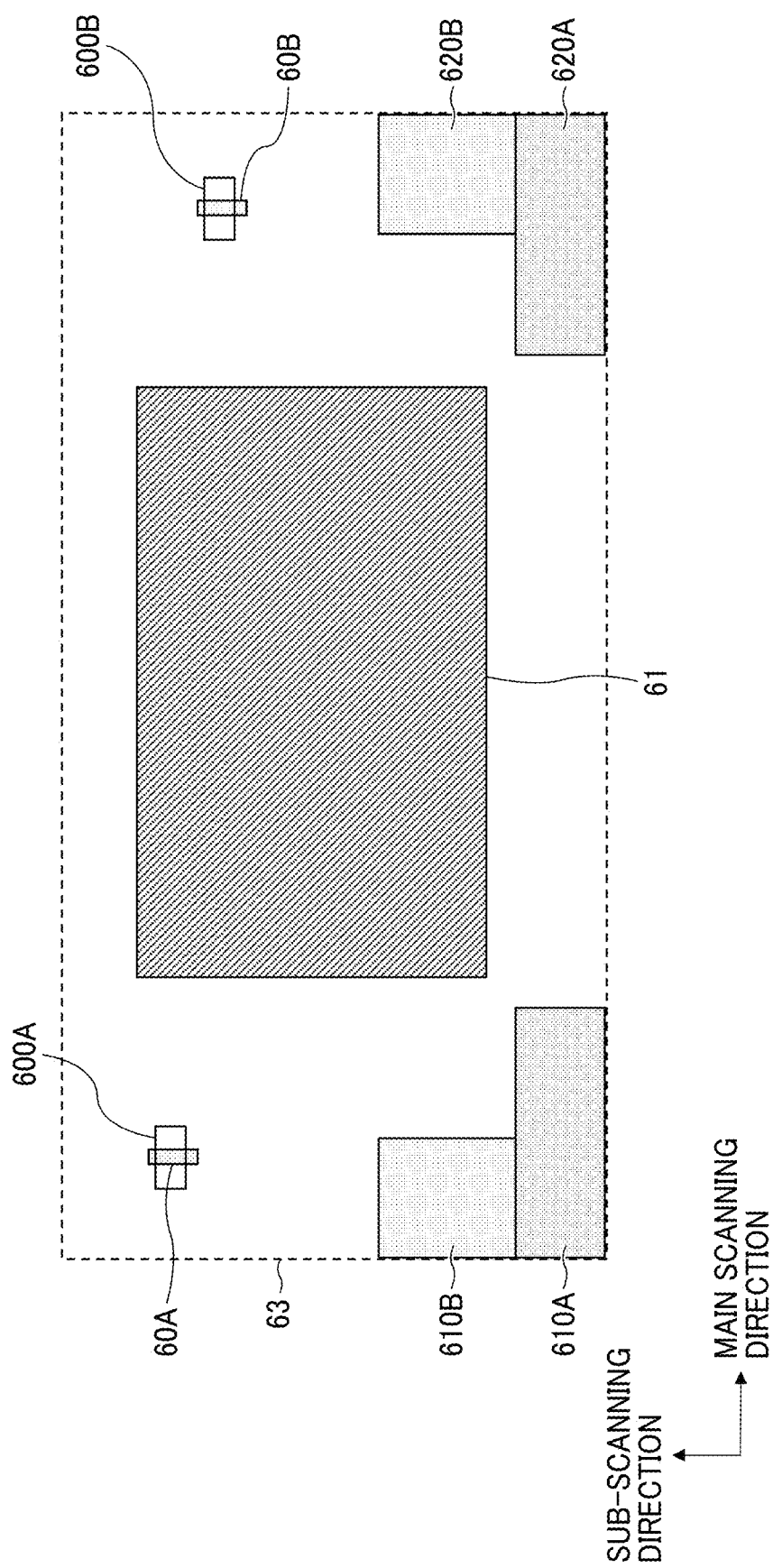

OPTICAL SCANNER, DISPLAY SYSTEM, AND MOBILE OBJECT

CROSS-REFERENCE TO RELATED APPLICATION

This patent application is based on and claims priority pursuant to 35 U.S.C. § 119(a) to Japanese Patent Application No. 2019-014078, filed on Jan. 30, 2019, in the Japan Patent Office, the entire disclosure of which is hereby incorporated by reference herein.

BACKGROUND

Technical Field

Embodiments of the present disclosure relate to an optical scanner, a display system, and a mobile object.

Background Art

An image display apparatus is known in the art in which a laser-beam source unit is controlled to output laser beams to a position outside an area in which a display image is formed within the scanning range of a scanning mirror unit and apart from an area of high interest detected by a watching-area detection unit.

SUMMARY

Embodiments of the present disclosure described herein provide an optical scanner, a display system, and a mobile object. The optical scanner includes a light source configured to emit irradiation light, a light deflector configured to scan the irradiation light emitted from the light source in a first scanning direction and in a second scanning direction intersecting with the first scanning direction, circuitry configured to turn on the light source for a predetermined length of time, and a photodetector configured to detect the irradiation light for the predetermined length of time. The predetermined length of time includes a timing at which the light deflector turns a scanning direction in the first scanning direction or the second scanning direction. The display system includes the optical scanner, a divergent part through which the irradiation light scanned by the light deflector is projected and diverges, an imaging optical system configured to reflect projection light projected through the divergent part; and a reflector configured to reflect reflection light reflected by the imaging optical system. The imaging optical system projects the projection light towards the reflector to form a virtual image. The mobile object includes the display system, and the reflector is a front windshield.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 19 is a diagram illustrating the temporal change in the track of a scanning line in the main scanning direction, according to an embodiment of the present disclosure.

FIG. 20 is a diagram illustrating the temporal change in the track of a scanning line in the sub-scanning direction, according to an embodiment of the present disclosure.

FIG. 22 is a diagram illustrating an image area and detection fields in a scanning range, according to a modification of the embodiment of the present disclosure illustrated in FIG. 18.

Figure 1:
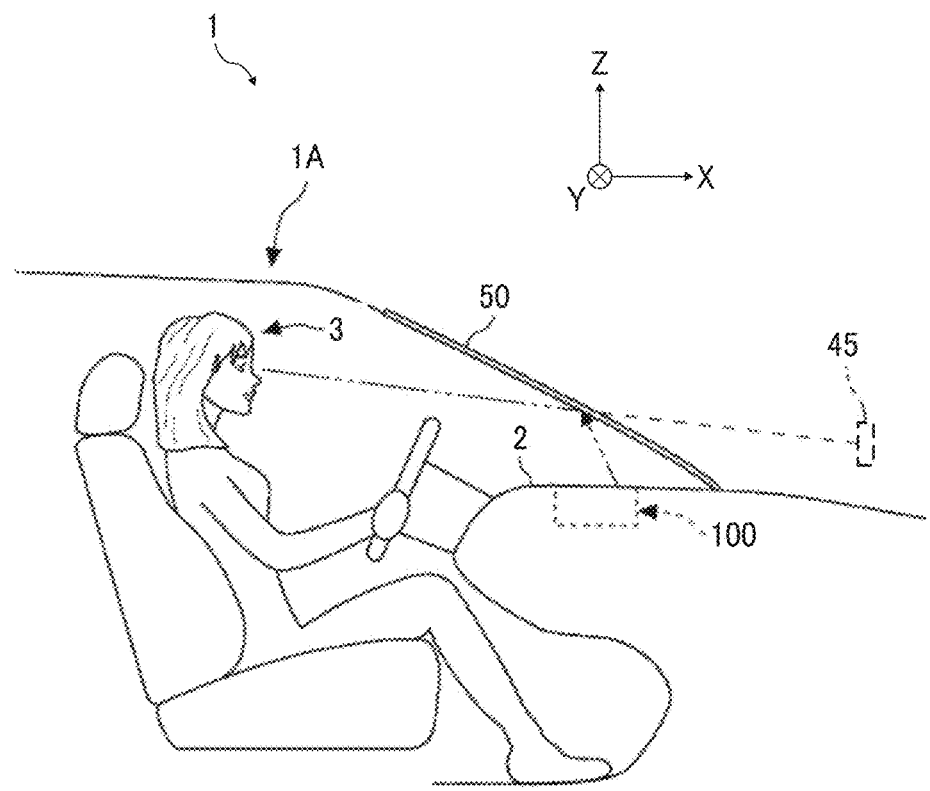
FIG. 1 is a diagram illustrating a system configuration of a display system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the accompanying drawings. In the description of the drawings, like reference signs denote like elements, and overlapping descriptions are omitted.

FIG. 1 is a diagram illustrating a system configuration of a display system 1 according to an embodiment of the present disclosure.

In the display system 1, the viewer 3 can visually identify a display image as projection light is projected from a mounted device 100 onto a transmissive reflector. The mounted device 100 is an example of a projector, and the display image is an image superimposed on the viewing field of the viewer 3 as a virtual image 45. For example, the display system 1 is provided for a mobile object such as a vehicle, an aircraft, and a ship, or an immobile object such as a maneuvering simulation system, and a home-theater system. In the present embodiment, cases are described in which the display system 1 is provided for a car that is an example of a mobile object 1A. However, no limitation is intended thereby, and the type of usage of the display system 1 is not limited to the present embodiment. The coordinate axes are defined as follows assuming that the directions of travel of the mobile object 1A is the X-axis direction, the right and left directions of the mobile object 1A is the Y-axis direction, and the up-and-down directions of the mobile object 1A is the Z-axis direction.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the viewer 3 and the front windshield 50 is about several tens of centimeters (cm) to one meter (m). In some embodiments, a combiner that is made of a small transparent plastic disk or the like may be used as a transmissive reflector in place of the front windshield 50.

For example, the mounted device 100 is a heads-up display (HUD). The mounted device 100 may be disposed at any desired position in conformity with the interior design of the car. For example, the mounted device 100 may be disposed under a dashboard 2 of the car or may be embedded in the dashboard 2. In the present embodiment, cases in which the mounted device 100 is mounted in the dashboard 2 are described.

Figure 2:
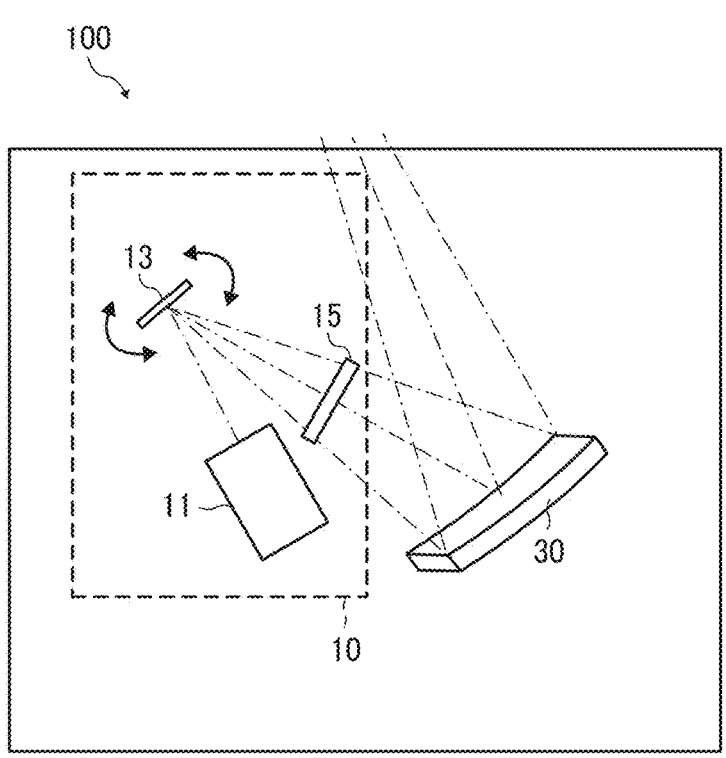
FIG. 2 is a diagram illustrating a configuration of a mounted device according to an embodiment of the present disclosure.

FIG. 2 is a diagram illustrating a configuration of the mounted device 100 according to the present embodiment.

The mounted device 100 includes a display device 10, a free-form surface mirror 30, and a front windshield 50.

The display device 10 includes a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 is an example of an image forming unit that receives the irradiation light emitted from the light-source device 11 and emits image light for forming an image. The light deflector 13 uses, for example, a microelectromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams emitted from the light deflector 13 scans the screen 15. The light deflector 13 is not limited to a MEMS mirror, but may be configured by a polygon mirror or the like.

The screen 15 is an example of a screen on which the image light emitted from the light deflector 13 forms an image. The screen 15 serves as a divergent part that diverges the laser beams at a predetermined divergence angle. For example, the screen may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the present embodiment adopts the laser scanning system. In particular, in the laser scanning system, since emitting/non-emitting can be assigned to each pixel, in general, a high-contrast image can be formed. In some alternative embodiments, the panel system may be adopted as the projection system in the display device 10.

The virtual image 45 is projected onto the free-form surface mirror 30 and the front windshield 50 as the intermediate image 40 that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or an element with a light-gathering power. The free-form surface mirror 30 is an example of an image forming optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected towards the free-form surface mirror 30, and are reflected by the front windshield 50. Accordingly, the viewer 3 can visually recognize the virtual image 45, i.e., the magnified image of the intermediate image 40 formed on the screen 15, due to the light reflected by the front windshield 50.

Figure 3:
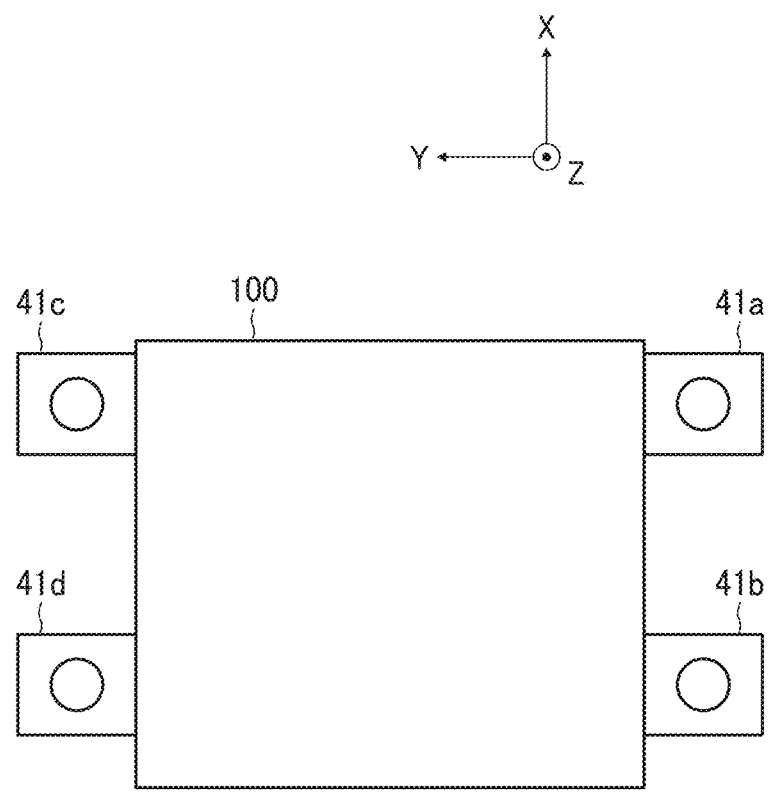
FIG. 3 is a top view of a mounted device according to an embodiment of the present disclosure.

FIG. 3 is a diagram illustrating a top view of the mounted device 100 according to the present embodiment.

As illustrated in FIG. 3, the mounted device 100 includes two attaching parts 41a and 41b on the right side, and includes two attaching parts 41c and 41d on the left side. These attaching parts 41a, 41b, 41c, and 41d are used to attach the mounted device 100 to the mobile object 1A. Each of the attaching parts 41a to 41d has a screw hole, and the mounted device 100 is attached to the mobile object 1A through these screw holes.

Figure 4:
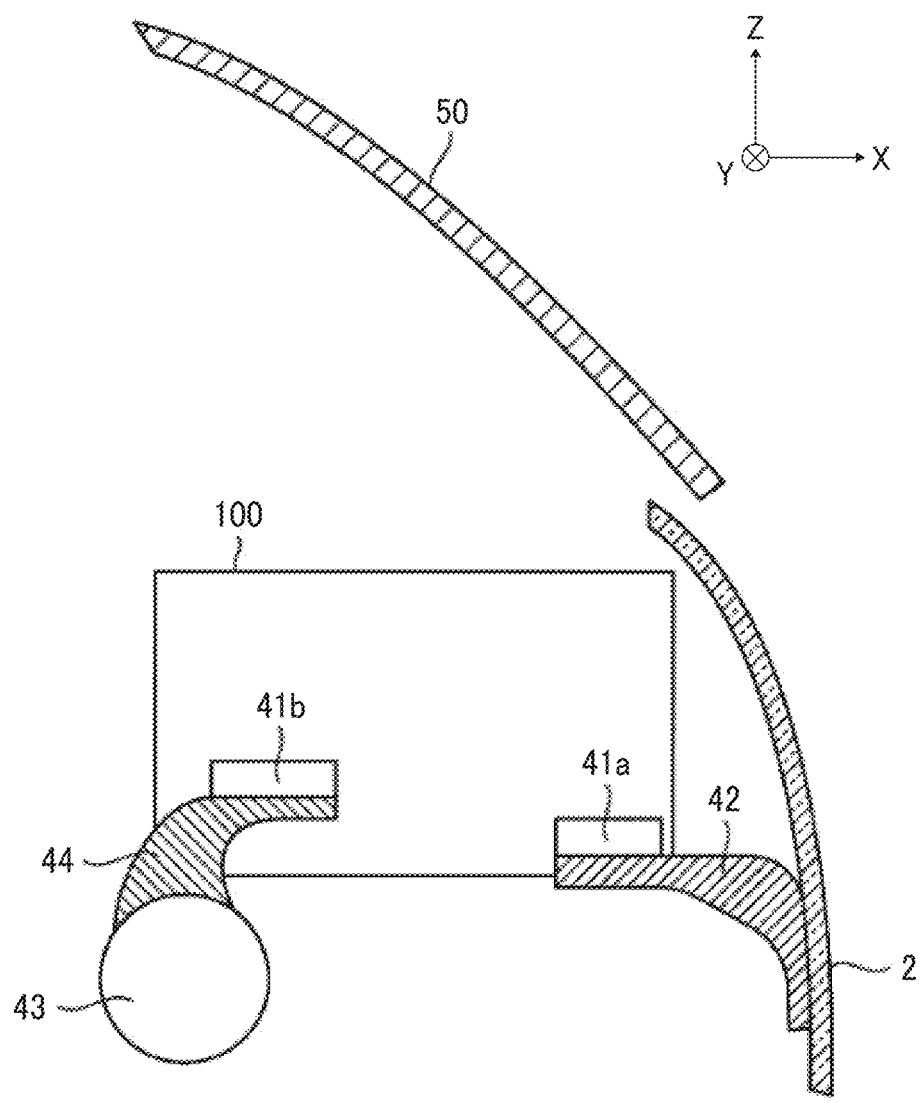
FIG. 4 is a side view of a mounted device according to an embodiment of the present disclosure.

FIG. 4 is a right side view of the mounted device 100 attached to the mobile object 1A, according to the present embodiment.

The mobile object 1A includes an attaching bracket 42, which is welded or fastened to the dashboard 2, and an attaching bracket 44, which is welded or fastened to a cross car beam 43. The attaching bracket 42 and the attaching bracket 44 are an example of an installation part. The mounted device 100 is attached to the mobile object 1A by fastening the attaching parts 41a and 41c to the attaching bracket 42 using screws or the like and by fastening the attaching parts 41b and 41d to the attaching bracket 44 using screws or the like.

Figure 5:
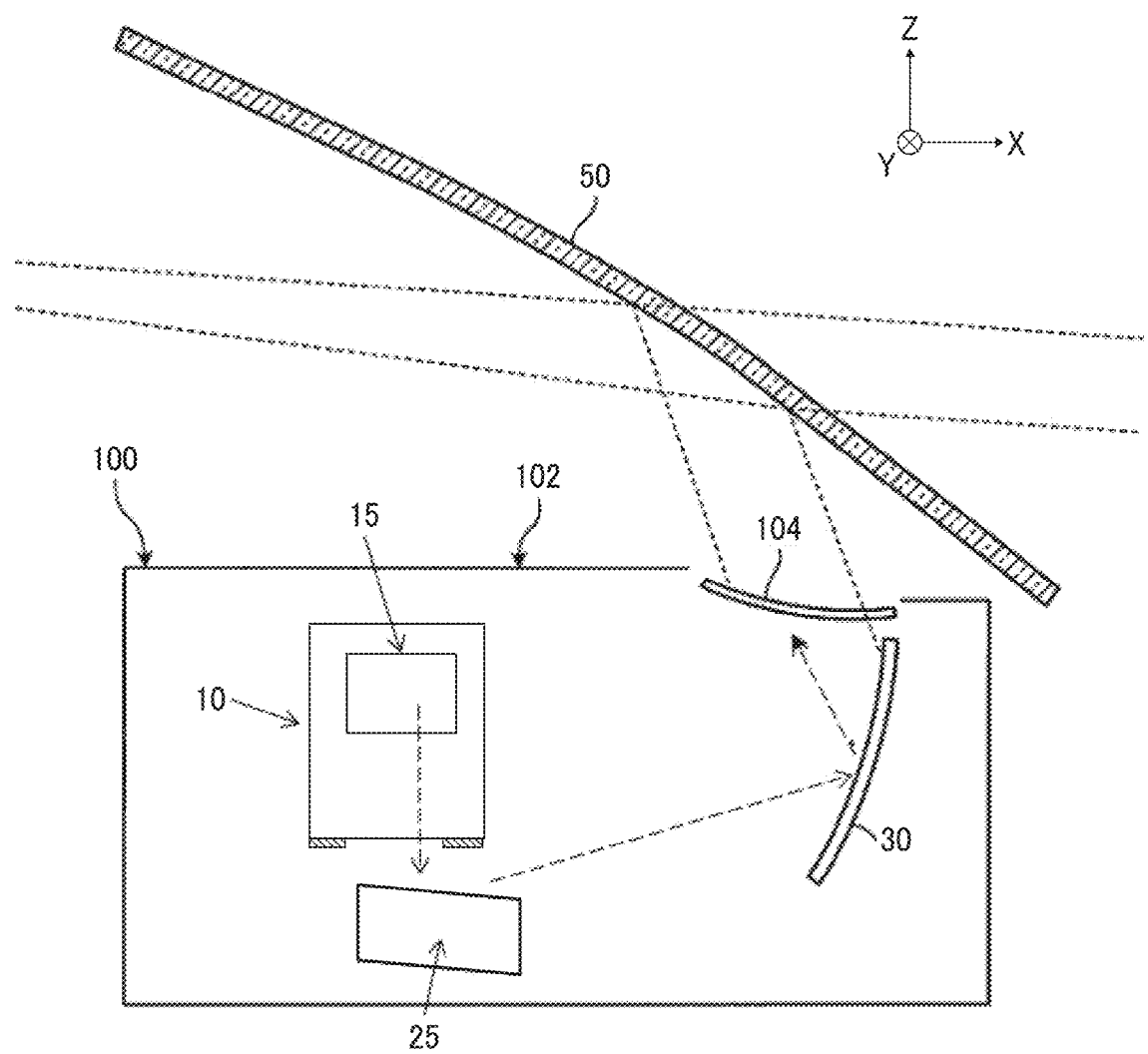
FIG. 5 is a cross-sectional side view of a mounted device according to an embodiment of the present disclosure.

FIG. 5 is a cross-sectional side view of the mounted device 100 as viewed from the right direction (the right side in the Y-direction), according to the present embodiment.

Figure 6:
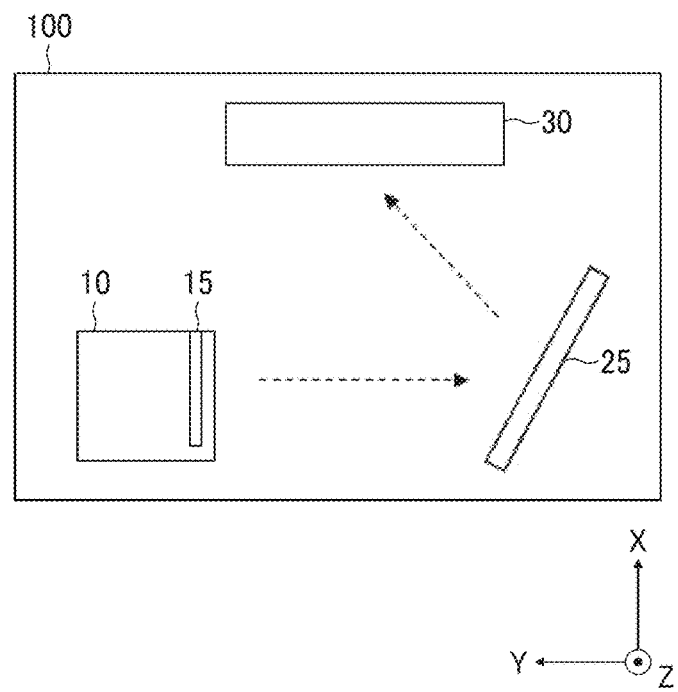
FIG. 6 is a cross-sectional top view of a mounted device according to an embodiment of the present disclosure.

FIG. 6 is a cross-sectional top view of the mounted device 100 as viewed from the upward direction (the Z-direction), according to the present embodiment.

FIG. 5 and FIG. 6 illustrate a concrete arrangement inside the mounted device 100 according to the present embodiment.

In addition to the display device 10 and the free-form surface mirror 30 as described above with reference to FIG. 2, the mounted device 100 includes a mirror 25 that is arranged inside a housing 102 to reflect the laser beams projected from the display device 10 towards the free-form surface mirror 30. The housing 102 has an exit window 104 that transmits the light reflected by the free-form surface mirror 30 and projects the reflected light onto the front windshield 50. The exit window is an example of a light transmission member. The display device 10 and the screen 15 are arranged so that the laser beams are projected in the right direction (the right side in the Y-direction).

Figure 7:
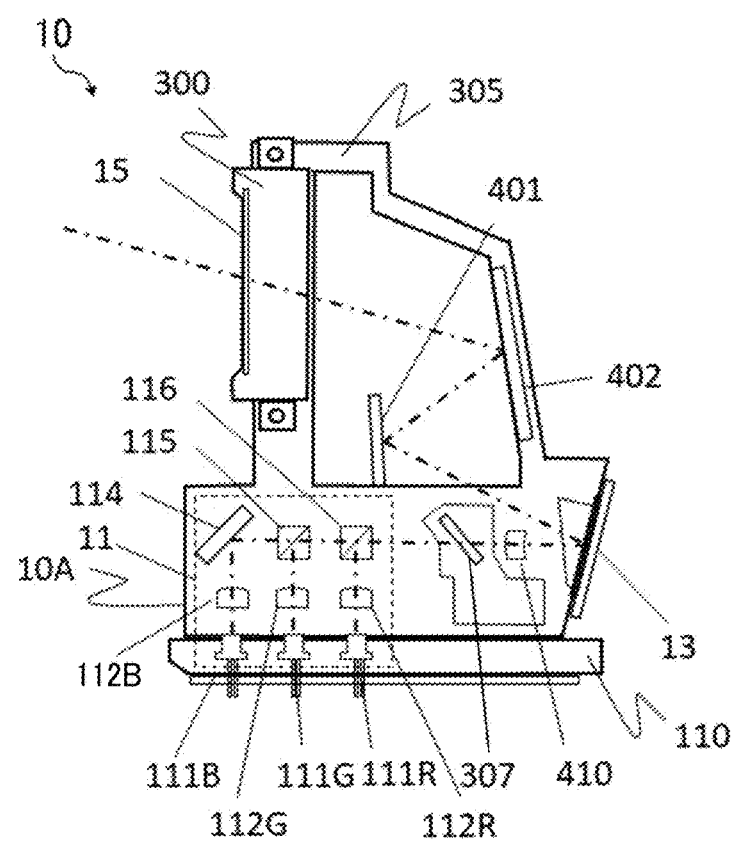
FIG. 7 is a diagram illustrating a configuration of a display device according to an embodiment of the present disclosure.

FIG. 7 is a diagram illustrating a configuration of the display device 10 according to the present embodiment.

In addition to the light-source device 11, the light deflector 13, and the screen 15 as described above with reference to FIG. 2, the display device 10 further includes a filter 307 that modulates the laser beams emitted from the light-source device 11, a condenser lens 410 that condenses the laser beams modulated by the filter 307 towards the light deflector 13, a first mirror 401 that reflects the laser beams deflected by the light deflector 13, and a second mirror 402 that reflects the laser beams reflected by the first mirror 401 towards the screen 15.

The light-source device 11 includes light-source elements 111R, 111G, and 111B (that may collectively be referred to as the light-source element 111 in the following description when it is not necessary to distinguish each of the light-source elements), coupling (collimate) lenses 112R, 112G, and 112B, and combiners 114, 115, and 116.

For example, each of the light-source elements 111 R, 111 G, and 111B of three colors (red, green, and blue (RGB)) is a laser diode (LD) having a single or a plurality of light-emitting points. The light-source elements 111R, 111G, and 111B emit laser beams (light flux) having different wavelengths $\lambda R$, $\lambda G$, and $\lambda B$, respectively. For example, $\lambda R$=640 nanometers (nm), $\lambda G$=530 nm, and $\lambda B$=445 nm.

The emitted laser beams (light flux) are coupled by the coupling lenses 112R, 112G, and 112B, respectively, and become approximately collimated light flux. The coupled laser beams (light flux) are combined by the three combiners 114, 115, and 116. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined laser beams (light flux) pass through the filter 307 and the condenser lens 410 and are guided to the light deflector 13.

The display device 10 is formed by assembling a housing 10A, a mirror unit (mirror holding member) 305, and a screen unit 300. The housing 10A holds and stores the light-source elements 111R, 111G, and 111B, the coupling lenses 112R, 112G, and 112B, the combiners 114, 115, and 116, the filter 307, the condenser lens 410, and the light deflector 13. The mirror unit 305 holds the first mirror 401 and the second mirror 402. The screen unit 300 is an example of a holding member that holds the screen 15.

A light source unit 110 is removable from the housing 10A and holds the light-source elements 111R, 111G, and 111B.

Figure 8:
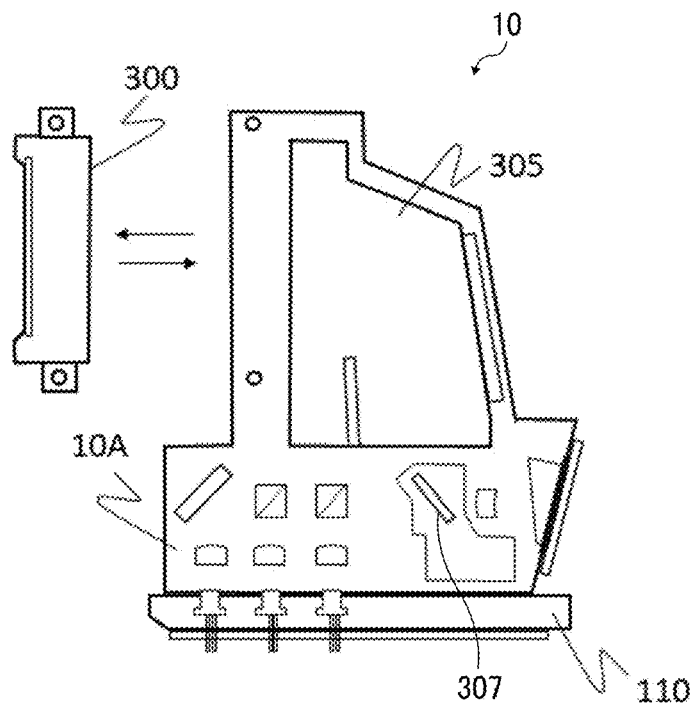
FIG. 8 is a diagram illustrating how a screen unit is attached to and removed from a display device, according to an embodiment of the present disclosure.

FIG. 8 illustrates how the screen unit 300 is attached to and removed from the display device 10, according to the present embodiment.

The screen unit 300 is attachable to and removable from the housing 10A without removing the light source unit 110 and the mirror unit 305 from the housing 10A. Moreover, the screen unit 300 is attachable to and removable from the housing 10A without removing the light-source device 11, the filter 307, the condenser lens 410, and the light deflector 13

The housing 10A is made of die-casting aluminum, and the mirror unit 305 is made of resin. The housing 10A has a higher thermal conductivity than the mirror unit 305.

The image light that diverges through the screen 15 reaches the front windshield 50 along the light path as illustrated in FIG. 1 and FIG. 2. However, in actual use, the sunlight that irradiates the front windshield 50 may travel reversely along the light path and may reach the screen 15 or the screen unit 300. In such cases, the shape or color of the screen 15 may change due to the heat of the sunlight, and the image quality may deteriorate.

In order to handle such a situation, in the present embodiment, the screen unit 300 is attached to the housing 10A. By so doing, compared with a case in which the screen unit 300 is attached to the mirror unit 305 that is positioned on the upstream side on the optical path, the heat of the screen 15 and the screen unit 300 can be easily dissipated, and the reduction in image quality can be prevented.

Moreover, the screen unit 300 is attachable to and removable from the housing 10A without removing, for example, the first mirror 401 and the second mirror 402 held by the mirror unit 305, the light deflector 13 from the housing 10A. Due to this configuration, the replacement or maintenance of the screen unit 300 can easily be performed in an independent manner. Accordingly, even when the shape or color of the screen 15 changes, the reduction in image quality can be prevented by performing replacement or maintenance of the screen 15.

As the curvature of the front windshield 50 differs depending on its type (vehicle type) of the mobile object 1A, the size, the position, and the angle of the screen 15 need to be adjusted in a delicate manner in accordance with the imaging optical system (i.e., the free-form surface mirror 30). However, by making the screen unit 300 detachable from the housing 10A or the like, the housing 10A or the like can be shared, and the productivity can be improved.

Figure 9:
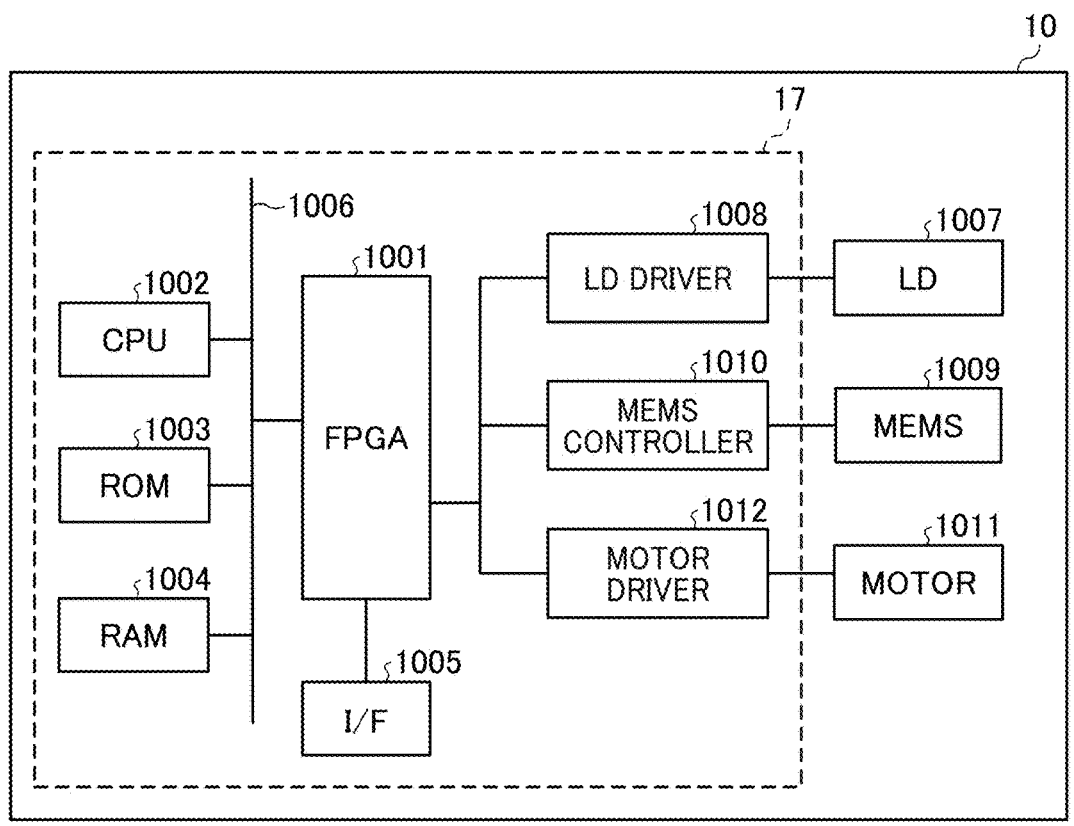
FIG. 9 is a diagram illustrating a hardware configuration of a display device according to an embodiment of the present disclosure.

FIG. 9 is a diagram illustrating a hardware configuration of the display device according to the present embodiment.

When necessary, some components or elements may be added to or deleted from the hardware configuration illustrated in FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis of the free-form surface mirror 30. The motor driver 1012 is a circuit that generates a driving signal for driving the motor 1011.

Figure 10:
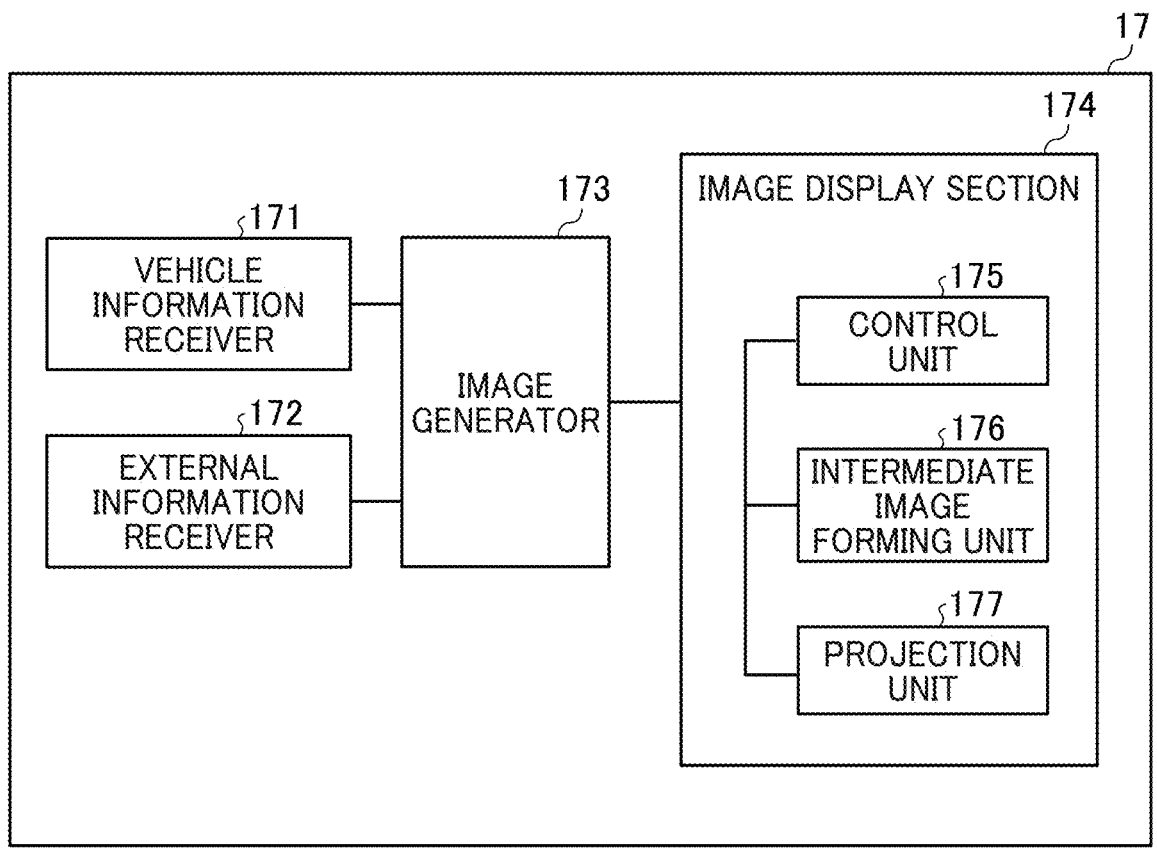
FIG. 10 is a diagram illustrating a functional configuration of a display device according to an embodiment of the present disclosure.

FIG. 10 is a diagram illustrating a functional configuration of a display device according to an embodiment of the present disclosure.

The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image 40 and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms an intermediate image 40 on the screen 15 based on the control signal generated by the control unit 175. The projection unit 177 projects the laser beams that form the intermediate image 40 towards the transmissive reflector (e.g., the front windshield 50) in order to form the virtual image 45 to be visually recognized by the viewer 3.

Figure 11:
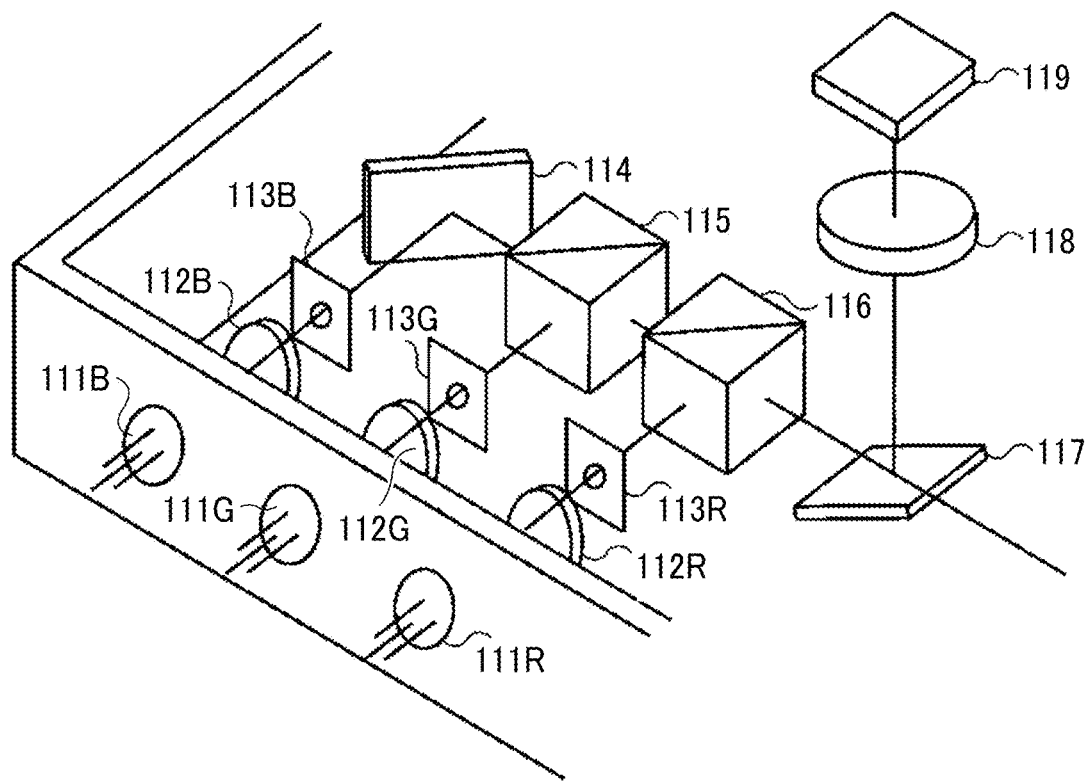
FIG. 11 is a diagram illustrating a specific configuration of a light-source device according to an embodiment of the present disclosure.

FIG. 11 is a diagram illustrating a specific configuration of the light-source device 11 according to the present embodiment.

In addition to the elements as described above with reference to FIG. 7, the light-source device 11 includes apertures 113R, 113G, and 113B, an optical-path branching element 117, a condenser lens 118, and a light receiver 119. The apertures 113R, 113G, and 113B are disposed between the coupling lenses 112R, 112G, and 112B and the combiners 114, 115, and 116, and shape the laser beams (light flux) that are coupled by the coupling lenses 112R, 112G, and 112B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The optical-path branching element 117 transmits some of the laser beams (light flux) exited through the combiner 116, and guides the laser beams (light flux) to the filter 307 as illustrated in FIG. 7. In parallel with that, the optical-path branching element 117 reflects different some of the laser beams (light flux) towards the condenser lens 118. The light receiver 119 is an example of a photodetector that detects the irradiation light that is emitted from the combiner 116 that is an example of a light source, and detects the radiation intensity of the laser beams that are concentrated by the condenser lens 118. The control unit 175 as described above with reference to FIG. 10 controls the intensity of the laser beams that emitted from the light-source device 11, based on the information about the intensity of the laser beams detected by the light receiver 119.

Figure 12:
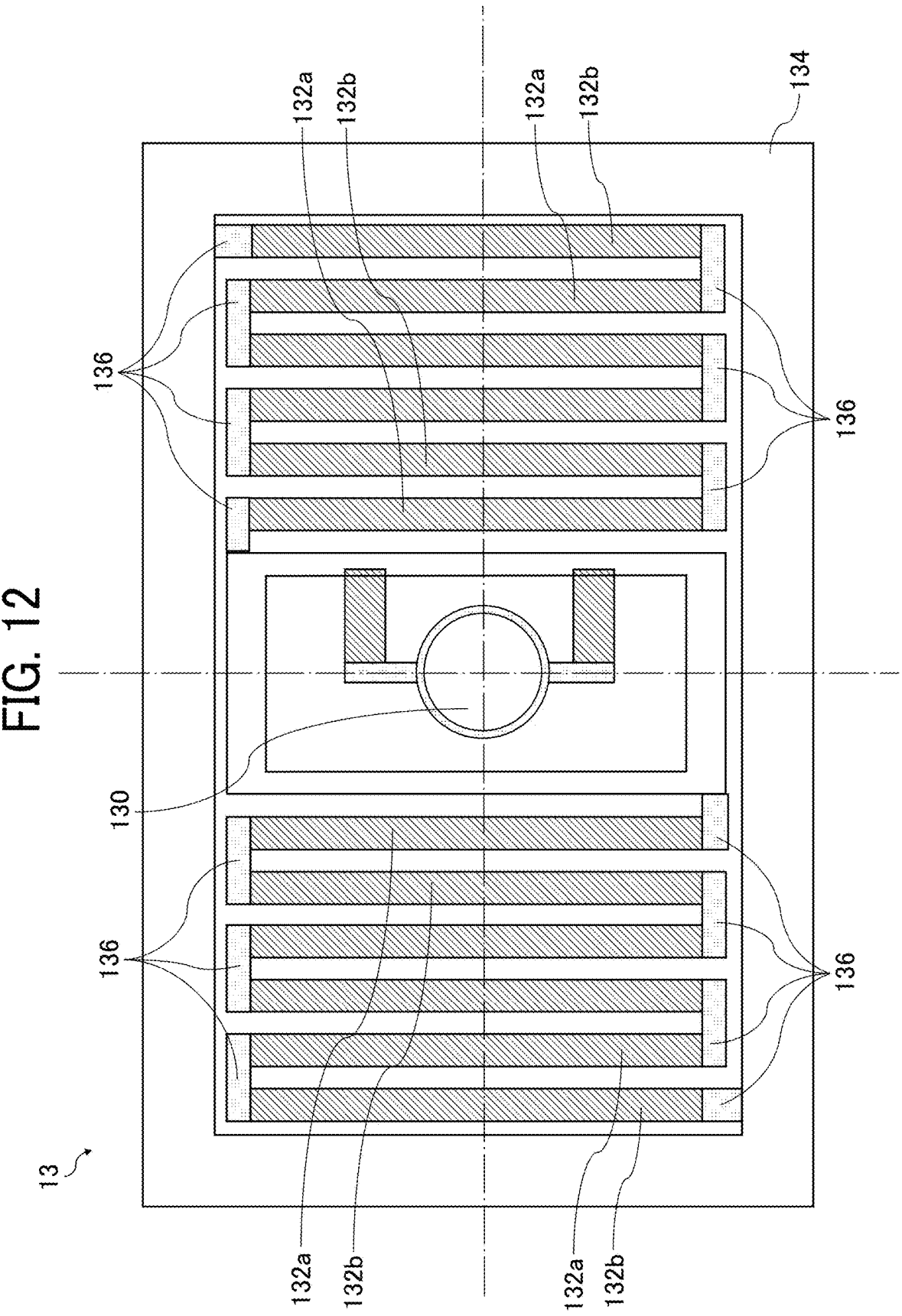
FIG. 12 is a diagram illustrating a specific configuration of a light deflector according to an embodiment of the present disclosure.

FIG. 12 is a diagram illustrating a specific configuration of the light deflector 13 according to the present embodiment.

The light deflector 13 is a MEMS mirror produced by semiconductor processing, and includes a mirror 130, serpentine beams 132a and 132b, a frame 134, and a piezoelectric member 136. The light deflector 13 performs scanning in the main scanning direction that is an example of a first scanning direction and in the sub-scanning direction that is an example of a second scanning direction intersecting with the first scanning direction.

The mirror 130 has a reflection plane that reflects the laser beams emitted from the light-source device 11 towards the screen 15 side. In the light deflector 13, a pair of serpentine beams 132a and 132b are formed across the mirror 130. Each of the pair of serpentine beams 132a and 132b has a plurality of turning portions. Each of these turning portions is configured by a first beam 132a and a second beam 132b that are arranged alternately. Each of the pair of serpentine beams 132a and 132b is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Figure 13:
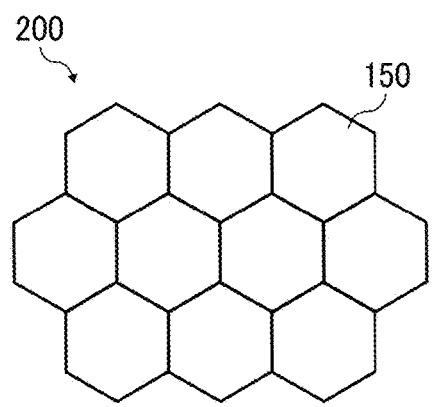
FIG. 13 is a diagram illustrating a specific configuration of a screen according to an embodiment of the present disclosure.

FIG. 13 is a diagram illustrating a specific configuration of the screen 15 according to the present embodiment.

The laser beams emitted from the LD 1007 that configures a part of the light-source device 11 on the screen 15. The screen 15 serves as a divergent part that diverges the laser beams at a predetermined divergence angle. As an example configuration in which a plurality of curved portions through which the light diverges are provided, the screen 15 as illustrated in FIG. 13 has a microlens-array structure in which a plurality of hexagonal-shaped microlenses 150 are arranged with no gap therebetween. The microlenses 150 are convex portions that are an example of the curved portions. The lens diameter of each one of the microlenses 150 (the distance between two sides that are opposed to each other) is about 200 micrometers (μm). As the microlenses 150 of the screen 15 have a hexagonal shape, the multiple microlenses 150 can be arrayed with high density. The microlens array 200 and the microlenses 150 according to the present embodiment will be described later in detail.

Figure 14A:
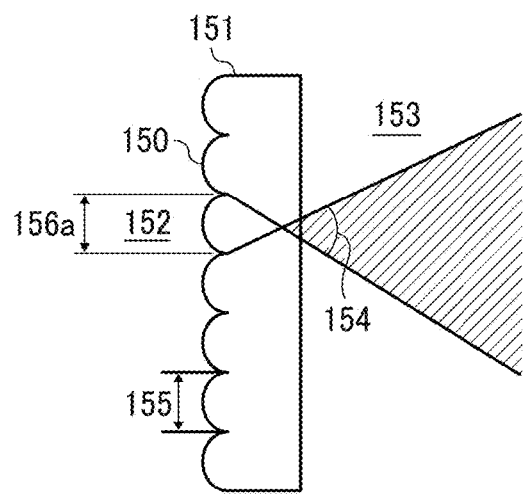
FIG. 14A and FIG. 14B are diagrams illustrating a difference in operation due to the differences in sizes of the diameter of incident light flux and the lens diameter in a microlens array, according to an embodiment of the present disclosure.
Figure 14B:
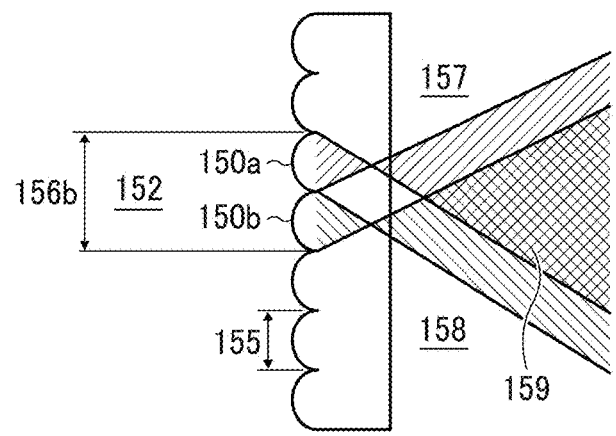

FIG. 14A and FIG. 14B are diagrams illustrating a difference in operation due to differences in sizes of the diameter of incident light flux and the lens diameter in the microlens array, according to the present embodiment.

As illustrated in FIG. 14A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the incident light 152 can diverge through the screen 15 at a desired divergence angle 154. The Lens diameter 155 at which the microlenses 150 are arranged is designed to be wider than a diameter 156*a* of the incident light 152. Accordingly, the screen 15 does not cause interference among the lenses, and interfering noise can be prevented from occurring.

FIG. 14B is a diagram illustrating the optical paths of diverging lights when a diameter 156*b* of the incident light 152 is twice wider than the lens diameter 155 at which the microlenses 150 are arranged.

The incident light 152 is incident on two microlenses 150*a* and 150*b*, and these two microlenses 150*a* and 150*b* produce two diverging lights 157 and 158, respectively. In such cases, lights may interfere with each other as two diverging lights exist in an area 159. Such an interference between two diverging lights (coherent light) is visually recognized as an interfering noise by an observer.

In view of the above circumstances, the lens diameter 155 at which the microlenses 150 are arranged is designed to be wider than the diameter 156*b* of the incident light 152 in order to reduce the interfering noise. A configuration with convex lenses is described as above with reference to FIG. 14A and FIG. 14B. However, no limitation is indicated thereby, and advantageous effects can be expected in a similar manner in a configuration with concave lenses.

Figure 15:
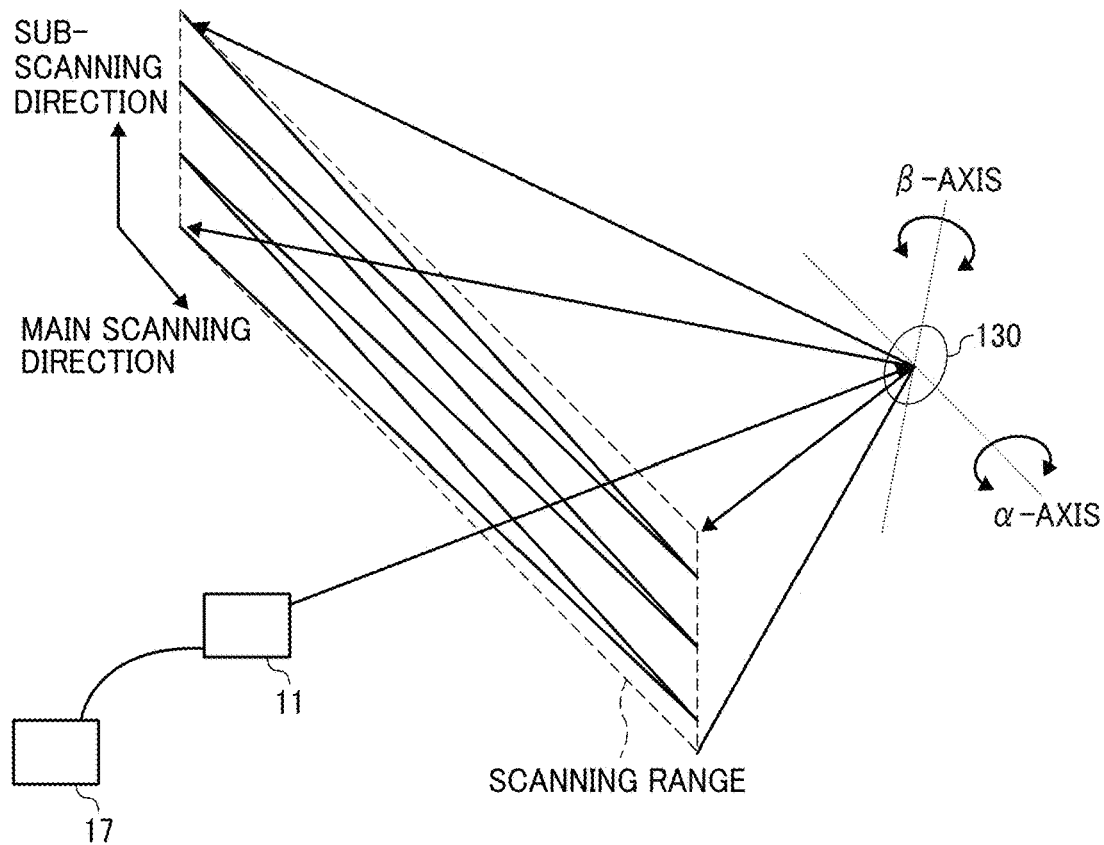
FIG. 15 is a diagram illustrating the relation between a mirror of a light deflector and the scanning range, according to an embodiment of the present disclosure.

FIG. 15 is a diagram illustrating the relation between the mirror 130 of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 15, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beam scans (two-way scans) the scanning range of the screen 15 in an oscillating manner in the main scanning direction at a high frequency of about 20,000 to 40,000 hertz (Hz), and scans (one-way scans) the scanning range of the screen 15 in the sub-scanning direction at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 16:
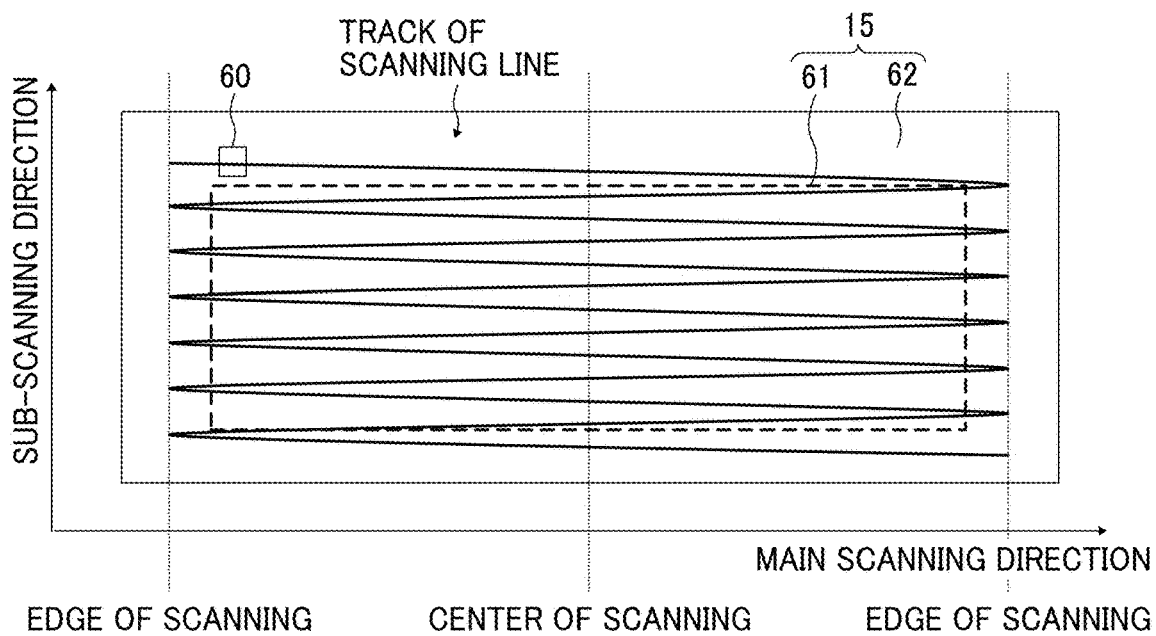
FIG. 16 is a diagram illustrating the track of a scanning line when two-dimensional scanning is performed, according to an embodiment of the present disclosure.

FIG. 16 is a diagram illustrating the track of a scanning line when two-dimensional scanning is performed, according to the present embodiment.

As illustrated in FIG. 16, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 16, the track of the scanning line in the scanning range is indicated by a zigzag line. For the sake of explanatory convenience, the number of scanning lines in FIG. 16 is less than the actual number of scanning lines.

As described above, the screen 15 is configured by a transmissive optical element such as the microlens array 200 that diffuses light. In the present embodiment, the shape of the image area 61 is rectangular or planar. However, no limitation is intended thereby, and the shape of the image area 61 may be polygonal or curved. Further, in some embodiments, the screen 15 may be a reflective optical element such as a micromirror array that diffuses light, depending on the design or layout of the display device 10. In the following description of the present embodiment, it is assumed that the screen 15 is configured by the microlens array 200.

The screen 15 is provided with a synchronous detection system 60 that includes a light receiver disposed at the edges of the image area 61 (a part of the frame area 62) in the scanning range. In FIG. 16, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

Figure 17:
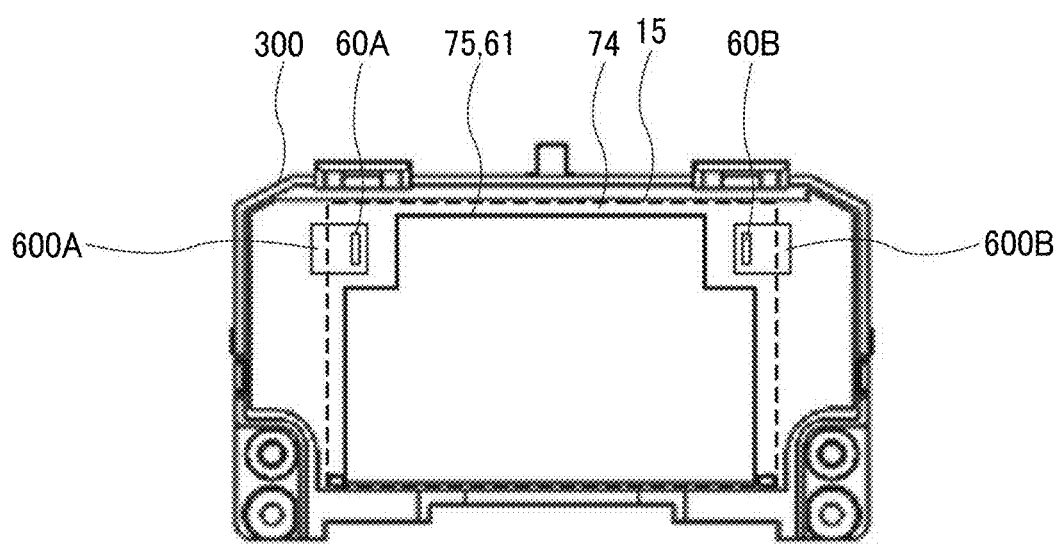
FIG. 17 is a plan view of a screen unit viewed from the upstream side of an optical path, according to an embodiment of the present disclosure.

FIG. 17 is a plan view of the screen unit 300 viewed from the upstream side of the optical path, according to the present embodiment.

The screen unit 300 is provided with a shielding part 74, which shields a part of the scanning light that is scanned by the light deflector 13, on the upstream side of the screen 15 on the optical path. The shielding part 74 has a window 75 through which the scanning light passes, and the area of the window 75 overlaps with the image area 61.

In the shielding part 74, synchronous detection systems 60A and 60B are disposed on the upstream side of the optical path. Synchronous detection fields 600A and 600B indicate the areas irradiated with the scanning light for the synchronous detection systems 60A and 60B, respectively.

Instead of the position of the shielding part 74 on the optical path, a shielding part that shielding part some of the scanning light that is scanned by the light deflector 13 may be arranged around the first mirror 401 or right after the light deflector 13 on the downstream side of the optical path.

Figure 18:
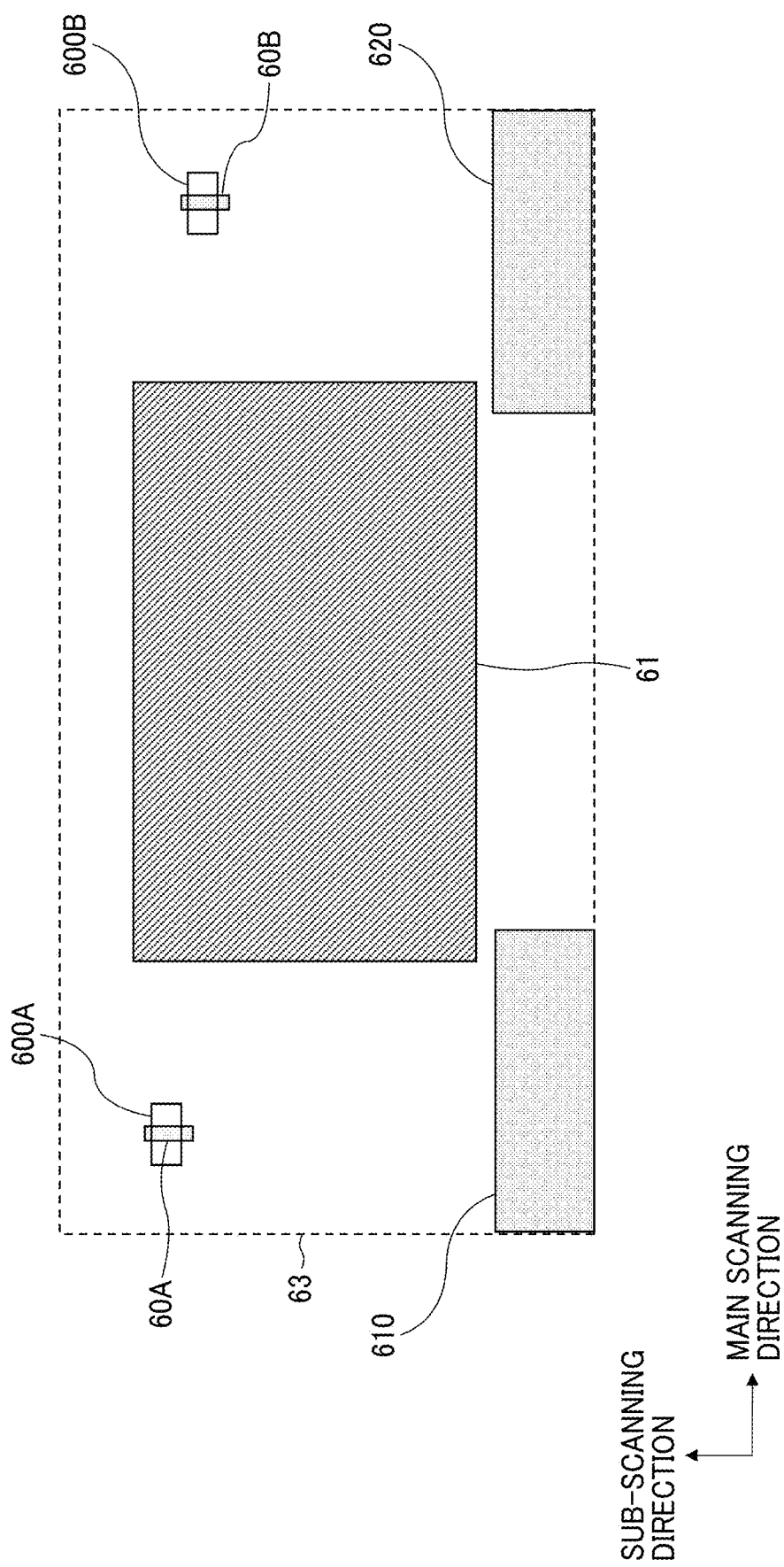
FIG. 18 is a diagram illustrating an image area and detection fields in a scanning range, according to an embodiment of the present disclosure.

FIG. 18 is a diagram illustrating the image area 61 and detection fields in the scanning range 63, according to the present embodiment.

Regarding the positions at which the screen 15 and the shielding part 74 are arranged on the optical path, the scanning range 63 that is two-dimensionally scanned by the light deflector 13 in the main scanning direction and the sub-scanning direction includes the image area 61 on which an image is to be formed, the synchronous detection fields 600A and 600B, and intensity detection fields 610 and 620 in which the intensity of the irradiation light that irradiates the light receiver 119 as illustrated in FIG. 11 is detected.

The image area 61 may be shifted from the center of the scanning range 63, or may be rotated with respect to the scanning range 63. Moreover, the shape of the image area 61 is not necessarily rectangular. For example, the shape of the image area 61 may be trapezoidal, elliptical, or polygonal as long as an image can be displayed in an appropriate manner.

As illustrated in FIG. 7 and FIG. 11, the light receiver 119 is arranged on the upstream side on the optical path of the irradiation light that is emitted from the combiner 116, with respect to the light deflector 13, and the intensity detection fields 610 and 620 and the light receiver 119 are simultaneously irradiated with the irradiation light that is emitted from the combiner 116 and then branched by the optical-path branching element 117. For this reason, the intensity of the irradiation light with which the intensity detection fields 610 and 620 are irradiated corresponds to the intensity of the irradiation light with which the light receiver 119 is irradiated.

Each of the intensity detection fields 610 and 620 is arranged so as not to overlap with the image area 61.

The scanning light with which the synchronous detection fields 600A and 600B and the intensity detection fields 610 and 620 are irradiated is expected to be blocked by the shielding part 74 as illustrated in FIG. 17. However, in actuality, an image that is formed on the image area 61 may be affected by the light that is reflected or scattered from a member that is arranged on the optical path such as the shielding part 74.

According to the present embodiment, the effect of the irradiation light with which the intensity detection fields 610 and 620 are irradiated can be reduced.

In the present embodiment, the bottom side of each of the intensity detection fields 610 and 620 coincides with the bottom side of the scanning range 63 in the sub-scanning direction.

The left side of the intensity detection field 610 coincides with the left side of the scanning range 63 in the main scanning direction, and the right side of intensity detection field 620 coincides with the right side of the scanning range 63 in the main scanning direction.

The edges of the scanning range 63 are at the positions where the light deflector 13 turns the scanning direction in the main scanning direction or the sub-scanning direction, and are at the positions where the scanning speed is zero.

In other words, as the intensity detection fields 610 and 620 include the edges of the scanning range 63 that are at the positions where the scanning speed is zero, the average scanning speed in the intensity detection fields 610 and 620 decreases in its entirety. Accordingly, the size of the intensity detection fields 610 and 620 can be reduced under the condition that the light receiver 119 is irradiated with light for the same length of time, and an image that is formed on the image area 61 can be prevented from being affected by, for example, the light reflected from the intensity detection fields 610 and 620.

The predetermined length of time during which the light deflector 13 scans, is previously determined, for example, by the designer, based on at least the timing at which the scanning direction is turned.

Moreover, as the length of time during which the light receiver 119 is irradiated with light can be extended under the condition that the intensity detection fields 610 and 620 of the same dimension are irradiated with light, the radiation intensity of the irradiation light can be detected with a high degree of accuracy.

Further, in some alternative embodiments, the length of time during which the light receiver 119 detects the light may be secured as the light deflector 13 performs two-dimensional scanning a plurality of times such that the intensity detection fields 610 and 620 are irradiated with light a plurality of times. In such a case, the control cycle can be shortened by reducing the number of times two-dimensionally scanning is performed.

In the present embodiment, each of the intensity detection fields 610 and 620 is arranged so as not to overlap with the image area 61 in the sub-scanning direction, and is arranged so as to overlap with the image area 61 in the main scanning direction. Due to this configuration, the image area 61 and the intensity detection fields 610 and 620 are separated from each other in the sub-scanning direction. For this reason, the time difference between the timing at which the image area 61 is irradiated with light and the timing at which the intensity detection fields 610 and 620 are irradiated with light can be increased, and an image that is formed on the image area 61 can be prevented from being affected by, for example, the light reflected from the intensity detection fields 610 and 620. Moreover, as the size of the intensity detection fields 610 and 620 may be increased in the main scanning direction to extend the length of time during which the light receiver 119 is irradiated with the light, the radiation intensity of the irradiation light can be detected with a high degree of accuracy.

FIG. 19 is a diagram illustrating the temporal change in the track of a scanning line in the main scanning direction, according to the present embodiment.

In FIG. 19, the horizontal axis indicates time, and the vertical axis indicates the position of a scanning line in the main scanning direction.

The control unit 175 as described above with reference to FIG. 10 turns on or turns off the light-source device 11, and controls the light deflector 13 to scan the light emitted from the light-source device 11 in the main scanning direction and the sub-scanning direction. Note that a state in which the control unit 175 turns on the light-source device 11 includes a state in which the light-source device 11 is turned on and turned off in alternating sequence, in a similar manner to the duty cycle control.

The control unit 175 controls the turning on and off of the light-source device 11 based on the image data, at the timing when the light deflector 13 scans the image area 61. It is illustrated in the drawings as if the light-source device 11 is always turned on for the image area 61. However, in actuality, the control unit 175 turns on the light-source device 11 when an image is present, and turns off the light-source device 11 when an image is not present.

The control unit 175 turns on the light-source device 11 for a predetermined length of time during which the light deflector 13 scans the intensity detection fields 610 and 620, and controls the light receiver 119 to detect the intensity of the irradiation light. Then, the control unit 175 controls the intensity of the irradiation light emitted from the light-source device 11 based on the information about the intensity of the irradiation light detected by the light receiver 119 during the above predetermined length of time.

In FIG. 19, a predetermined length of time during which the light deflector 13 scans the intensity detection fields 610 and 620 is indicated by several parts of the track of the scanning line that are highlighted in bold, and includes several timings at which the light deflector 13 turns the scanning direction in the main scanning direction.

The timings at which the scanning direction is turned are at the positions where the scanning speed is zero. For this reason, when a predetermined length of time during which the light deflector 13 scans the intensity detection fields 610 and 620 includes the timings at which the scanning direction is turned, the average scanning speed decreases during such a predetermined length of time. Accordingly, the size of the intensity detection fields 610 and 620 can be reduced under the condition that the light receiver 119 is irradiated with light for the same length of time, and an image that is formed on the image area 61 can be prevented from being affected by, for example, the light reflected from the intensity detection fields 610 and 620.

Moreover, as the length of time during which the light receiver 119 is irradiated with light can be extended under the condition that the intensity detection fields 610 and 620 of the same dimension are irradiated with light, the radiation intensity of the irradiation light can be detected with a high degree of accuracy.

Further, in some alternative embodiments, the length of time during which the light receiver 119 detects the light may be secured as the light deflector 13 performs two-dimensional scanning a plurality of times such that the intensity detection fields 610 and 620 are irradiated with light a plurality of times. In such a case, the control cycle can be shortened by reducing the number of times two-dimensionally scanning is performed.

In the present embodiment, the control unit 175 turns on the light-source device 11 for a predetermined length of time such that each of the intensity detection fields 610 and 620 is arranged so as not to overlap with the image area 61. Accordingly, an image that is formed on the image area 61 can be prevented from being affected by, for example, the light reflected from the intensity detection fields 610 and 620.

Further, the control unit 175 turns on the light-source device 11 for a predetermined length of time such that each of the intensity detection fields 610 and 620 is not included in the image area 61 in one cycle of scanning in the main scanning direction and each of the intensity detection fields 610 and 620 overlaps with the image area 61 in the main scanning direction. Due to such a configuration, the image area 61 and the intensity detection fields 610 and 620 are not together included in one cycle of scanning in the main scanning direction. For this reason, the time difference between the timing at which the image area 61 is irradiated with light and the timing at which the intensity detection fields 610 and 620 are irradiated with light can be increased, and an image that is formed on the image area 61 can be prevented from being affected by, for example, the light reflected from the intensity detection fields 610 and 620. Moreover, as the size of the intensity detection fields 610 and 620 may be increased in the main scanning direction to extend the length of time during which the light receiver 119 is irradiated with the light, the radiation intensity of the irradiation light can be detected with a high degree of accuracy.

FIG. 20 is a diagram illustrating the temporal change in the track of a scanning line in the sub-scanning direction, according to the present embodiment.

In FIG. 20, the horizontal axis indicates time, and the vertical axis indicates the position of a scanning line in the sub-scanning direction.

The control unit 175 controls the light-source device 11 to turn on based on the image data, at the timing when the light deflector 13 scans the image area 61. In a similar manner to the above description with reference to FIG. 19, the control unit 175 turns on the light-source device 11 when an image is present, and turns off the light-source device 11 when an image is not present.

The control unit 175 turns on the light-source device 11 for a predetermined length of time during which the light deflector 13 scans the intensity detection fields 610 and 620, and controls the light receiver 119 to detect the intensity of the irradiation light. Then, the control unit 175 controls the intensity of the irradiation light emitted from the light-source device 11 based on the information about the intensity of the irradiation light detected by the light receiver 119 during the above predetermined length of time.

In FIG. 20, a predetermined length of time during which the light deflector 13 scans the intensity detection fields 610 and 620 is indicated by several parts of the track of the scanning line that are highlighted in bold, and includes several timings at which the light deflector 13 turns the scanning direction in the sub-scanning direction.

Accordingly, in a similar manner to FIG. 19, the size of the intensity detection fields 610 and 620 can be reduced under the condition that the light receiver 119 is irradiated with light for the same length of time, and an image that is formed on the image area 61 can be prevented from being affected by, for example, the light reflected from the intensity detection fields 610 and 620.

Moreover, as the length of time during which the light receiver 119 is irradiated with light can be extended under the condition that the intensity detection fields 610 and 620 of the same dimension are irradiated with light, the radiation intensity of the irradiation light can be detected with a high degree of accuracy.

Further, in some alternative embodiments, the length of time during which the light receiver 119 detects the light may be secured as the light deflector 13 performs two-dimensional scanning a plurality of times such that the intensity detection fields 610 and 620 are irradiated with light a plurality of times. In such a case, the control cycle can be shortened by reducing the number of times two-dimensionally scanning is performed.

In the present embodiment, the control unit 175 turns on the light-source device 11 for a predetermined length of time such that each of the intensity detection fields 610 and 620 is arranged so as not to overlap with the image area 61. Accordingly, an image that is formed on the image area 61 can be prevented from being affected by, for example, the light reflected from the intensity detection fields 610 and 620.

Further, the control unit 175 turns on the light-source device 11 for a predetermined length of time such that each of the intensity detection fields 610 and 620 is arranged so as not to overlap with the image area 61 in the sub-scanning direction. Due to such configurations as described above, the time difference between the timing at which the image area 61 is irradiated with light and the timing at which the intensity detection fields 610 and 620 are irradiated with light can be increased, and an image that is formed on the image area 61 can be prevented from being affected by, for example, the light reflected from the intensity detection fields 610 and 620.

FIG. 21A, FIG. 21B, FIG. 21C, and FIG. 21D are diagrams each illustrating the track of scanning line of the first half and second half of the go and return scanning, in the sub-scanning direction, according to the present embodiment.

Figure 21A:
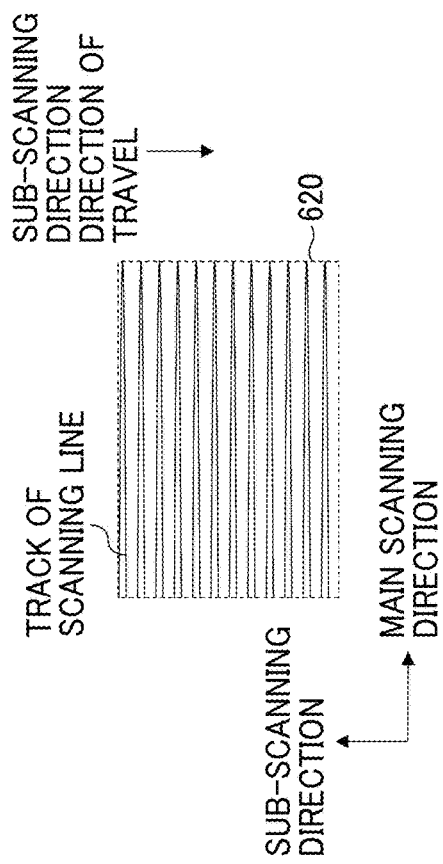
FIG. 21A, FIG. 21B, FIG. 21C, and FIG. 21D are diagrams each illustrating the track of scanning line of the first half and second half of the go and return scanning, in the sub-scanning direction, according to an embodiment of the present disclosure.
Figure 21B:
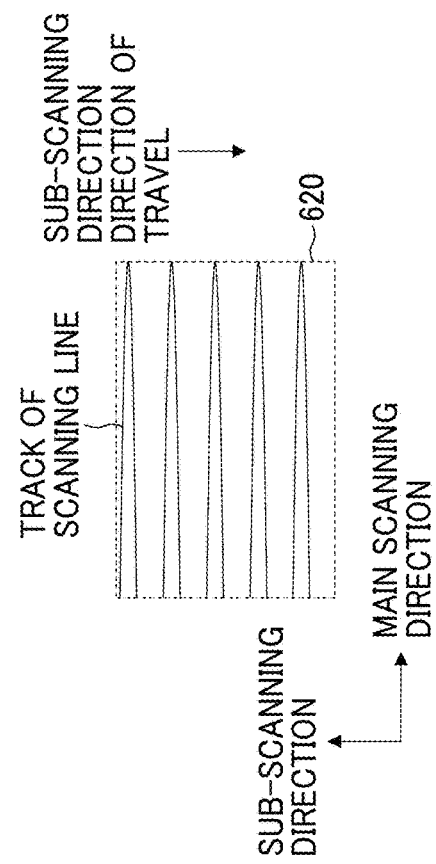

FIG. 21A and FIG. 21B are diagrams each illustrating the first half of the go and return scanning in the sub-scanning direction, i.e., the track of a scanning line in the direction in which an image is formed on the image area 61, according to the present embodiment.

Figure 21C:
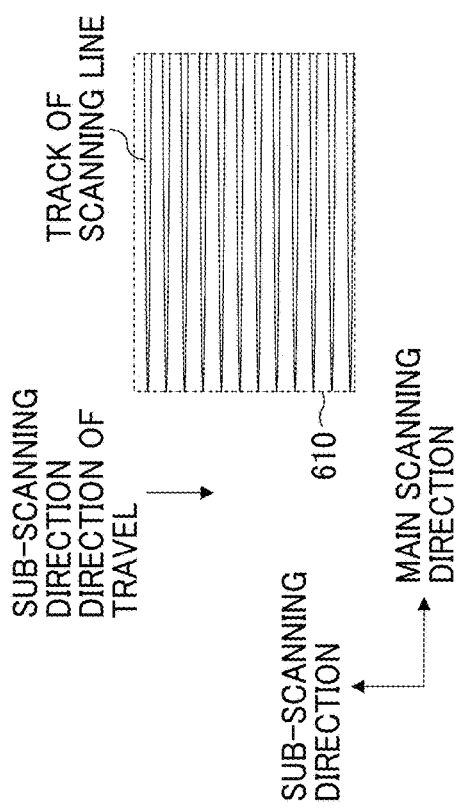
Figure 21D:
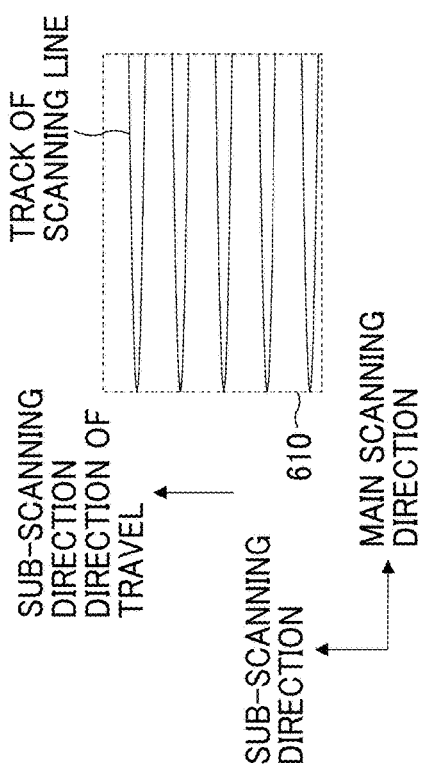

FIG. 21C and FIG. 21D are diagrams each illustrating the second half of the go and return scanning in the sub-scanning direction, i.e., the track of a scanning line in the direction in which an image is not formed on the image area 61, according to the present embodiment.

The scanning speed is faster and the gap between two scanning lines in the sub-scanning direction is wider in the second half of the go and return scanning as illustrated in FIG. 21C and FIG. 21D than in the first half of the go and return scanning as illustrated in FIG. 21A and FIG. 21B.

The control unit 175 turns on the light-source device 11 for a predetermined length of time during which the light deflector 13 scans the intensity detection fields 610 and 620, and such a predetermined length of time includes both the timing at which the light deflector 13 turns the scanning direction in the main scanning direction and the timing at which the light deflector 13 turns the scanning direction in the sub-scanning direction.

FIG. 22 is a diagram illustrating the image area 61 and detection fields in the scanning range 63, according to a modification of the embodiment of the present disclosure illustrated in FIG. 18.

In the present modification of the embodiment of the present disclosure, at the positions where the screen 15 and the shielding part 74 are arranged on the optical path, the scanning range 63 includes an image area 61, synchronous detection fields 600A and 600B, first intensity detection fields 610A and 620A, and second intensity detection fields 610B and 620B.

The control unit 175 turns on the light-source device 11 for a first predetermined length of time during which the light deflector 13 scans the first intensity detection fields 610A and 620A, and controls the light receiver 119 to detect the intensity of the irradiation light.

The control unit 175 turns on the light-source device 11 for a second predetermined length of time during which the light deflector 13 scans second intensity detection fields 610B and 620B, and controls the light receiver 119 to detect the intensity of the irradiation light.

Then, the control unit 175 controls the intensity of the irradiation light emitted from the light-source device 11 based on the information about the intensity of the irradiation light detected by the light receiver 119 during the first and second predetermined length of time.

Each of the first intensity detection fields 610A and 620A and the second intensity detection fields 610B and 620B is arranged so as not to overlap with the image area 61. In other words, the control unit 175 turns on the light-source device 11 for the first predetermined length of time such that each of the first intensity detection fields 610A and 620A is arranged so as not to overlap with the image area 61, and turns on the light-source device 11 for the second predetermined length of time such that each of the second intensity detection fields 610B and 620B is arranged so as not to overlap with the image area 61.

The bottom side of each of the first intensity detection fields 610A and 620A coincides with the bottom side of the scanning range 63 in the sub-scanning direction. In other words, the first predetermined length of time during which the light deflector 13 scans the first intensity detection fields 610A and 620A includes the timing at which the light deflector 13 turns the scanning direction in the sub-scanning direction.

The left sides of the first intensity detection field 610A and the second intensity detection field 610B coincide with the left side of the scanning range 63 in the main scanning direction, and the right sides of the first intensity detection field 620A and the second intensity detection field 620B coincide with the right side of the scanning range 63 in the main scanning direction. In other words, each one of the first predetermined length of time during which the light deflector 13 scans the first intensity detection fields 610A and 620A and the second predetermined length of time during which the light deflector 13 scans second intensity detection fields 610B and 620B includes the timing at which the light deflector 13 turns the scanning direction in the main scanning direction.

In the present modification, each of the first intensity detection fields 610A and 620A is arranged so as not to overlap with the image area 61 in the main scanning direction and the sub-scanning direction. In other words, the control unit 175 turns on the light-source device 11 for the first predetermined length of time such that each of the first intensity detection fields 610A and 620A does not to overlap with the image area 61 in the main scanning direction and the sub-scanning direction.

Due to such a configuration, the image area 61 and the first intensity detection fields 610A and 620A are separated from each other in the sub-scanning direction, and the time difference between the timing at which the image area 61 is irradiated with light and the timing at which the first intensity detection fields 610A and 620A are irradiated with light can be increased. Accordingly, an image that is formed on the image area 61 can be prevented from being affected by, for example, the light reflected from the first intensity detection fields 610A and 620A.

In the present modification, each of the second intensity detection fields 610B and 620B is arranged so as not to overlap with the image area 61 in the main scanning direction, and each of the second intensity detection fields 610B and 620B is arranged so as to overlap with the image area 61 in the sub-scanning direction. In other words, the control unit 175 turns on the light-source device 11 for the second predetermined length of time such that each of the second intensity detection fields 610B and 620B does not overlaps with the image area 61 in the main scanning direction and such that each of the second intensity detection fields 610B and 620B overlaps with the image area 61 in the sub-scanning direction.

Due to such a configuration, the length of time during which the light receiver 119 is irradiated with the light can be extended together with the first intensity detection fields 610A and 620A. Accordingly, the radiation intensity of the irradiation light can be detected with a high degree of accuracy.

In the present modification, on the other hand, each of the second intensity detection fields 610B and 620B overlaps with the image area 61 in the sub-scanning direction. Accordingly, there is some concern that an image that is formed on the image area 61 is affected by, for example, the light reflected from the second intensity detection fields 610B and 620B.

In view of the above circumstances, in the present modification of the second embodiment, the intensity of the irradiation light that is emitted from the light-source device 11 is reduced in the second intensity detection fields 610B and 620B compared with the first intensity detection fields 610A and 620A. In other words, the control unit 175 increases the intensity of the irradiation light emitted from the light-source device 11 during the first predetermined length of time where the light deflector 13 scans first intensity detection fields 610A and 620A, and decreases the intensity of the irradiation light emitted from the light-source device 11 during the second predetermined length of time where the light deflector 13 scans second intensity detection fields 610B and 620B. Accordingly, an image that is formed on the image area 61 can be prevented from being affected by, for example, the light reflected from the second intensity detection fields 610B and 620B.

Figure 23:
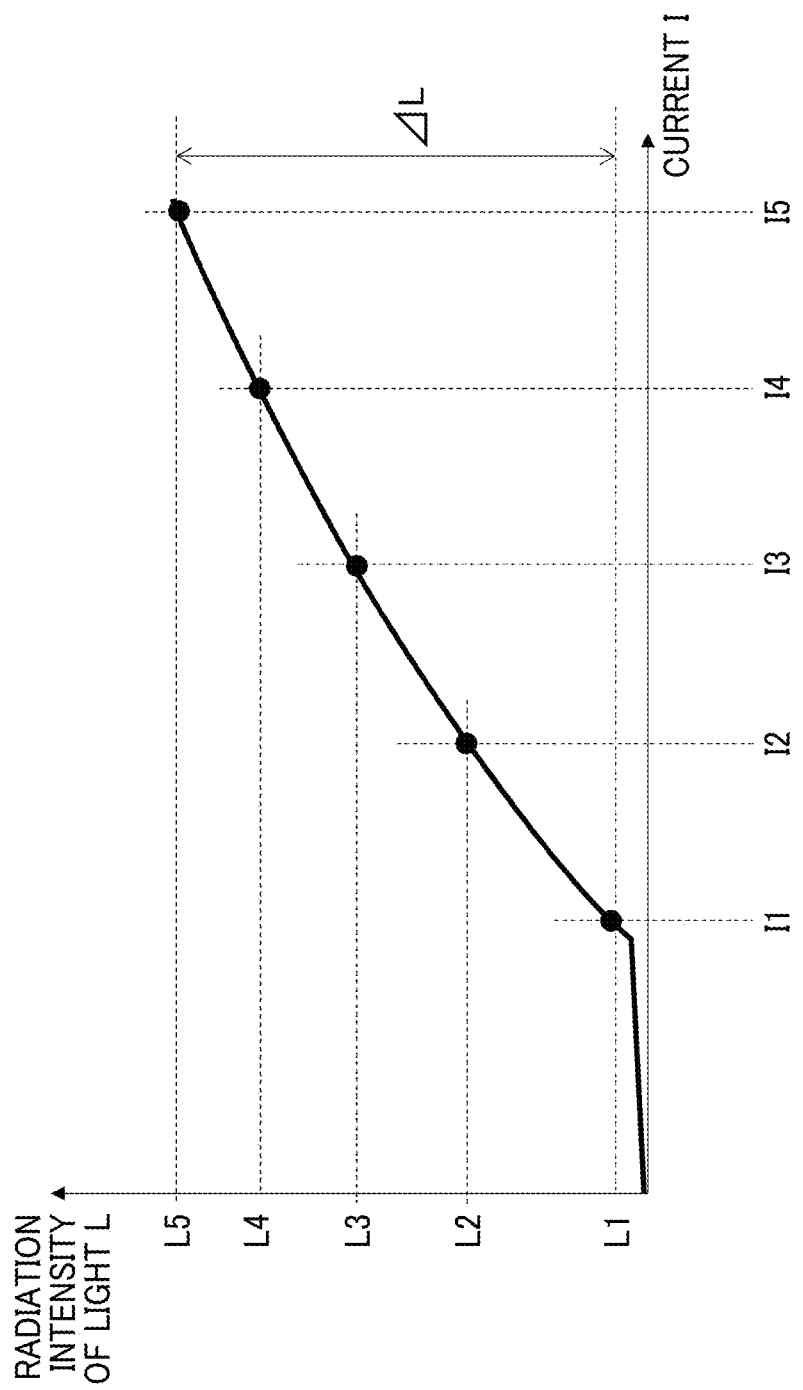
FIG. 23 is a diagram illustrating the intensity of irradiation light according to the related art.

FIG. 23 is a diagram illustrating the intensity of irradiation light according to the related art.

More specifically, FIG. 23 illustrates the characteristics between the radiation intensity of light and current of a general-purpose semiconductor laser.

In cases where the control unit 175 controls the turning on and off of the light-source device 11 within the range of light intensity ΔL between L1 and L5 at the timing when the light deflector 13 scans the image area 61, it is desired that the control unit 175 control the turning on and off of the light-source device 11 within the range of the light intensity ΔL or within range around the range of the light intensity ΔL even during a predetermined length of time where the light deflector 13 scans the intensity detection fields 610 and 620.

In regard to five points including radiation intensity of light L1 to L5, the control unit 175 controls the turning on and off of the light-source device 11 for a predetermined length of time during which the light deflector 13 scans the intensity detection fields 610 and 620. The number of points in the measurement is not limited to five and may be any desired number. For example, the range of the radiation intensity of light in the first intensity detection fields 610A and 620A as illustrated in FIG. 22 is between L4 and L5, and the range of the radiation intensity of light in the second intensity detection fields 610B and 620B as illustrated in FIG. 22 is between L1 and L3. If the light-source device 11 is turned on only with the one point of radiation intensity of light L3, that point is regarded as a range with strong radiation intensity of light.

As described above with reference to FIG. 18, it is desired that the intensity detection fields 610 and 620 be apart from the image area 61 as much as possible and not contiguous with the image area 61 in the main scanning direction.

When it is difficult to arrange all the intensity detection fields 610 and 620 so as not to be continuous to each other in the main scanning direction, as illustrated in FIG. 22, the first intensity detection fields 610A and 620A whose light intensity is strong may be arranged so as not to be contiguous with the image area 61 in the main scanning direction, and the second intensity detection fields 610B and 620B whose light intensity is weak may be contiguous with the image area 61 in the main scanning direction.

Figure 24:
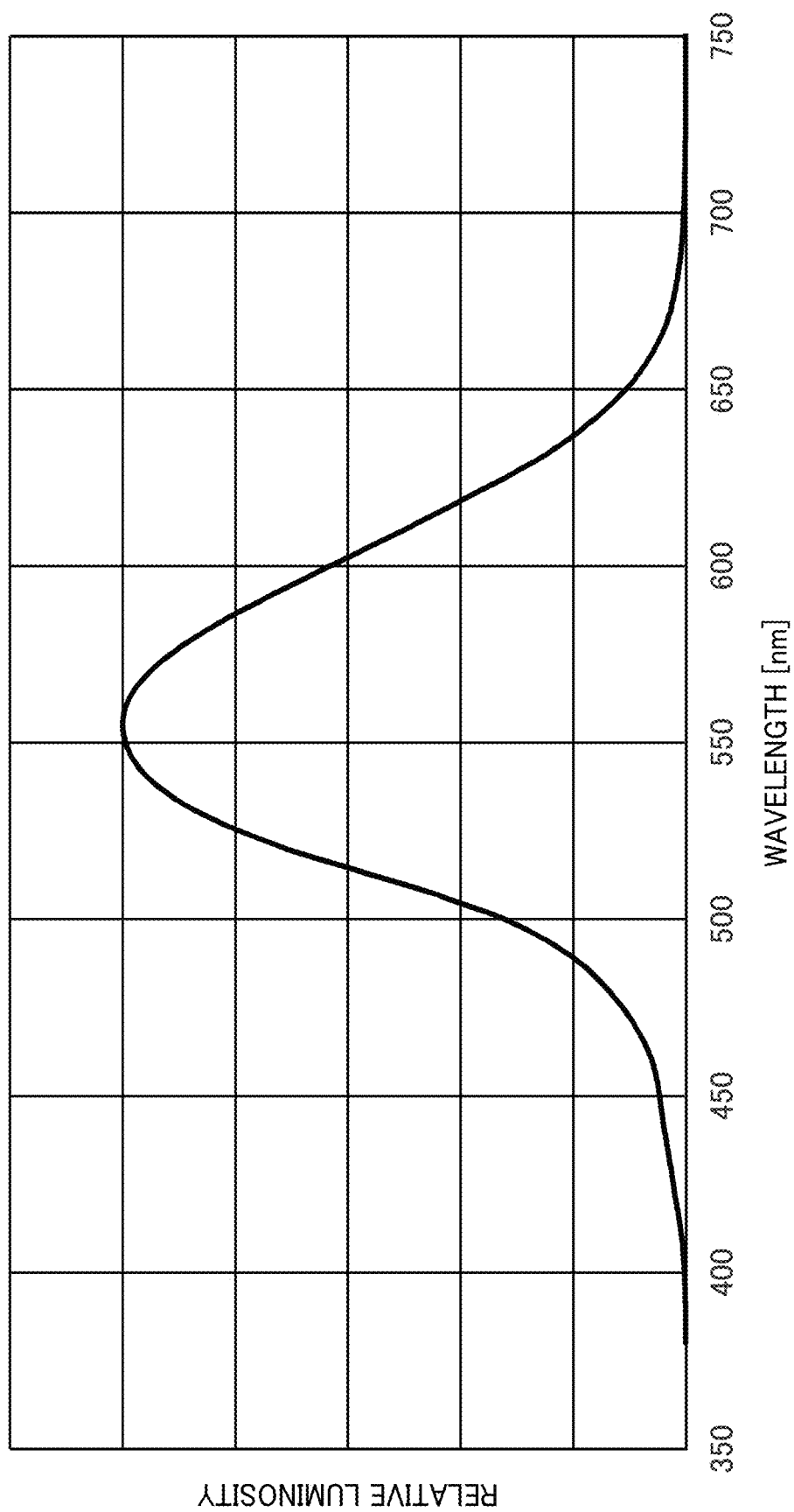
FIG. 24 is a diagram illustrating the relation between the wavelength of the irradiation light and the relative luminosity, according to an embodiment of the present disclosure.

FIG. 24 is a diagram illustrating the relation between the wavelength of the irradiation light and the relative luminosity, according to the present embodiment.

More specifically, FIG. 24 illustrates a standard relative luminosity curve of photopic vision, and the relative luminosity reaches its peak when the wavelength of the irradiation light is at 555 nm. When the wavelength of the irradiation light is equal to or shorter than 500 nm or equal to or longer than 630 nm, the relative luminosity is reduced to about one third of the peak. In other words, the viewability is low in such short-wavelength regions, and even if an image that is formed on the image area 61 is irradiated with, for example, the light reflected from the intensity detection fields 610 and 620, it is highly likely that such irradiation does not cause a problem and can be ignored.

In order to handle such a situation, in the modification as described above with reference to FIG. 22, when the second intensity detection fields 610B and 620B are to be irradiated with light, the control unit 175 controls light-source device 11 such that the light emitted from the light-source device 11 does not include the light whose wavelength is longer than 500 nanometers (nm) and shorter than 630 nm.

On the other hand, when the light that is emitted from the light-source device 11 includes the light whose wavelength is longer than 500 nm and shorter than 630 nm, the control unit 175 controls the light-source device 11 such that the second intensity detection fields 610B and 620B are not irradiated with the light and the first intensity detection fields 610A and 620A are irradiated with the light.

Due to such configurations as described above, the second intensity detection fields 610B and 620B are not irradiated with laser beams with high visibility whose wavelength is longer than 500 nm and shorter than 630 nm. Accordingly, even if an image that is formed on the image area 61 is irradiated with, for example, the light reflected from the second intensity detection fields 610B and 620B in an overlapping manner, it is unlikely that such light is visually recognized.

Due to a configuration in which the first intensity detection fields 610A and 620A are irradiated with laser beams with high visibility whose wavelength is longer than 500 nm and shorter than 630 nm, the radiation intensity of the laser beams whose wavelength is longer than 500 nm and shorter than 630 nm can be detected, and an image that is formed on the image area 61 can be prevented from being affected by, for example, the light reflected from the first intensity detection fields 610A and 620A.

As known in the art, when laser beams of white color are generated, the radiation intensity of laser beams of red color is greater than the radiation intensity of laser beams of blue color. For this reason, when an image that is formed on the image area 61 is irradiated with the light of red color, i.e., the light whose wavelength is equal to or longer than 630 nm, it is likely that such light is visually recognized.

In order to handle such a situation, in the modification as described above with reference to FIG. 22, when the second intensity detection fields 610B and 620B are to be irradiated with light, the control unit 175 controls light-source device 11 such that the light emitted from the light-source device 11 does not include the light whose wavelength is equal to or longer than 630 nm.

When the light that is emitted from the light-source device 11 includes the light whose wavelength is equal to or longer than 630 nm, the control unit 175 controls the light-source device 11 such that the second intensity detection fields 610B and 620B are not irradiated with the light and the first intensity detection fields 610A and 620A are irradiated with light.

Due to such configurations as described above, even if the intensity of laser beams whose wavelength is equal to or longer than 630 nm is increased, the second intensity detection fields 610B and 620B are not irradiated with laser beams whose wavelength is equal to or longer than 630 nm. Accordingly, even if an image that is formed on the image area 61 is irradiated with, for example, the light reflected from the second intensity detection fields 610B and 620B in an overlapping manner, it is unlikely that such light is visually recognized.

Due to a configuration in which the first intensity detection fields 610A and 620A are irradiated with laser beams with high visibility whose wavelength is equal to or longer than 630 nm, the radiation intensity of laser beams whose wavelength is equal to or longer than 630 nm can be detected, and an image that is formed on the image area 61 can be prevented from being affected by, for example, the light reflected from the first intensity detection fields 610A and 620A.

As described above with the accompanying drawings, in the present embodiment, the intensity detection fields 610 and 620 and the first intensity detection fields 610A and 620A are arranged so as not to overlap with the image area 61 in the sub-scanning direction.

However, as long as the detection sensitivity of the light receiver 119 is configured at an appropriate level, the intensity of the irradiation light can be detected even if the intensity of the irradiation light with which the intensity detection fields are irradiated is low. In such a configuration, only the intensity detection fields such as the second intensity detection fields 610B and 620B may be used that do not overlap with the image area 61 in the main scanning direction and are arranged so as to overlap with the image area 61 in the sub-scanning direction.

Further, depending on the wavelength or intensity of the irradiation light with which the intensity detection fields are irradiated and the type of an image that is formed on the image area 61, an intensity detection fields may be adopted that is arranged so as to overlap with the image area 61 in the main scanning direction and the sub-scanning direction.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The display device according to an embodiment of the present disclosure is applicable not only to a heads-up display (HUD) but also to, for example, a head-mounted display, a prompter, and a projector. For example, when a display device according to an embodiment of the present disclosure is applied to a projection device, such a projection device can be configured in a similar manner to the display device 10. In other words, the display device 10 may project the image light onto, for example, a projection screen or a wall through the free-form surface mirror 30. The display device may project the image light that has passed through the screen 15 onto, for example, a projection screen or a wall, without involving the free-form surface mirror 30.

What is claimed is:

1. An optical scanner comprising:
   a light source configured to emit irradiation light;
   a light deflector configured to scan a scanning range of a screen with the irradiation light emitted from the light source in a first scanning direction and in a second scanning direction intersecting with the first scanning direction to form an image, the scanning range including an image area and a non-image area, the image area being an area of the screen on which an image on the screen is to be formed and the non-image area surrounding the image area in the first scanning direction and the second scanning direction;
   circuitry configured to turn the light source from an off state to an on state for a length of time after the light source crosses a boundary in the at least one of the first scanning direction or the second scanning direction into the non-image area such that the length of time the light source is turned on while in the non-image area includes a timing at which the light deflector turns a scanning direction in one or more of the first scanning direction or the second scanning direction; and
   a photodetector configured to detect the irradiation light for the length of time.

2. The optical scanner according to claim 1, wherein the length of time includes both a timing at which the light deflector turns the scanning direction in the first scanning direction and a timing at which the light deflector turns the scanning direction in the second scanning direction.

3. The optical scanner according to claim 1,
   wherein the first scanning direction is a main scanning direction and the second scanning direction is a sub-scanning direction, and
   wherein the circuitry is configured to turn on the light source for the length of time such that the light source is turned on while the light deflector is scanning a portion of the scanning range not overlapping with the image area in the second scanning direction and overlapping with the image area in the first scanning direction.

4. The optical scanner according to claim 1,
   wherein the first scanning direction is a main scanning direction and the second scanning direction is a sub-scanning direction,
   wherein the length of time includes a first length of time and a second length of time, and
   wherein the circuitry is configured to,
      turn on the light source while the light deflector is scanning a portion of the scanning range not overlapping the image area in the sub-scanning direction during the first length of time, and
      turn on the light source while the light deflector is scanning a portion of the scanning range overlapping the image area in the sub-scanning direction and not overlapping the image area in the main scanning direction during the second length of time.

5. The optical scanner according to claim 4, wherein the circuitry is configured to decrease a radiation intensity of the irradiation light emitted from the light source for the second length of time, compared with the first length of time.

6. The optical scanner according to claim 4, wherein, for the second length of time, the circuitry is configured to turn on the light source so as not to include light whose wavelength is longer than 500 nm and shorter than 630 nm.

7. The optical scanner according to claim 4, wherein the circuitry is configured to turn on the light source for the first length of time to emit light whose wavelength is longer than 500 nm and shorter than 630 nm.

8. The optical scanner according to claim 4, wherein, for the second length of time, the circuitry is configured to turn on the light source so as not to include light whose wavelength is equal to or longer than 630 nm.

9. The optical scanner according to claim 4, wherein the circuitry is configured to turn on the light source for the first length of time to emit light whose wavelength is equal to or longer than 630 nm.

10. The optical scanner according to claim 1, wherein the photodetector is on an upstream side on an optical path of the irradiation light with respect to the light deflector.

11. The optical scanner according to claim 10, wherein the circuitry is configured to control an intensity of the irradiation light emitted from the light source based on information about the intensity of the irradiation light detected during the length of time.

12. The optical scanner according to claim 1, wherein edges of the scanning range correspond to positions where the light deflector operates at a scanning speed is zero such that an average scanning speed in the non-image area is less than an average scanning speed in the image area when the length of time the light source is turned on in the non-image area includes the timing at which the light deflector turns the scanning direction.

13. The optical scanner according to claim 12, wherein the average scanning speed in the non-image area is less than the average scanning speed such that a gap exists separating a time at which the image area is irradiated with the irradiation light and a time at which a portion of the non-image area is irradiated with the irradiation light.

14. A display system comprising:
an optical scanner including,
a light source configured to emit irradiation light,
a light deflector configured to scan a scanning range of a screen with the irradiation light emitted from the light source in a first scanning direction and in a second scanning direction intersecting with the first scanning direction to form an image, the scanning range including an image area and a non-image area, the image area being an area of the screen on which an image on the screen is to be formed and the non-image area surrounding the image area in the first scanning direction and the second scanning direction,
circuitry configured to turn the light source from an off state to an on state for a length of time after the light source crosses a boundary in the at least one of the first scanning direction or the second scanning direction into the non-image area such that the length of time the light source is turned on while in the non-image area includes a timing at which the light deflector turns a scanning direction in one or more of the first scanning direction or the second scanning direction, and
a photodetector configured to detect the irradiation light for the length of time;
a divergent part through which the irradiation light scanned by the light deflector is projected and diverges;
an imaging optical system configured to reflect projection light projected through the divergent part; and
a reflector configured to reflect reflection light reflected by the imaging optical system,
wherein the imaging optical system projects the projection light towards the reflector to form a virtual image.

15. The display system according to claim 14, wherein edges of the scanning range correspond to positions where the light deflector operates at a scanning speed is zero such that an average scanning speed in the non-image area is less than an average scanning speed in the image area when the length of time the light source is turned on in the non-image area includes the timing at which the light deflector turns the scanning direction.

16. The display system according to claim 15, wherein the average scanning speed in the non-image area is less than the average scanning speed such that a gap exists separating a time at which the image area is irradiated with the irradiation light and a time at which a portion of the non-image area is irradiated with the irradiation light.

17. The display system according to claim 14, wherein the circuitry is further configured to control an intensity of the irradiation light emitted from the light source based on information about the intensity of the irradiation light detected during the length of time.

18. A mobile object comprising a display system including:
an optical scanner including,
a light source configured to emit irradiation light,
a light deflector configured to scan a scanning range of a screen with the irradiation light emitted from the light source in a first scanning direction and in a second scanning direction intersecting with the first scanning direction to form an image, the scanning range including an image area and a non-image area, the image area being an area of the screen on which an image on the screen is to be formed and the non-image area surrounding the image area in the first scanning direction and the second scanning direction,
circuitry configured to turn the light source from an off state to an on state for a length of time after the light source crosses a boundary in the at least one of the first scanning direction or the second scanning direction into the non-image area such that the length of time the light source is turned on while in the non-image area includes a timing at which the light deflector turns a scanning direction in one or more of the first scanning direction or the second scanning direction, and
a photodetector configured to detect the irradiation light for the length of time;
a divergent part through which the irradiation light scanned by the light deflector is projected and diverges;
an imaging optical system configured to reflect projection light projected through the divergent part; and
a front windshield configured to reflect reflection light reflected by the imaging optical system,
wherein the imaging optical system projects the projection light towards the front windshield to form a virtual image.

19. The mobile object according to claim 18, wherein edges of the scanning range correspond to positions where the light deflector operates at a scanning speed is zero such that an average scanning speed in the non-image area is less than an average scanning speed in the image area when the length of time the light source is turned on in the non-image area includes the timing at which the light deflector turns the scanning direction.

20. The mobile object according to claim 19, wherein the average scanning speed in the non-image area is less than the average scanning speed such that a gap exists separating a time at which the image area is irradiated with the irradiation light and a time at which a portion of the non-image area is irradiated with the irradiation light.

\* \* \* \* \*